United States Patent
Kujirai

(10) Patent No.: US 8,867,096 B2
(45) Date of Patent: Oct. 21, 2014

(54) IMAGE FORMING APPARATUS, IMAGE FORMING METHOD, AND DOCUMENT MANAGEMENT SYSTEM CAPABLE OF EXECUTING COLOR CORRECTION

(75) Inventor: Yasuhiro Kujirai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 168 days.

(21) Appl. No.: 13/572,468

(22) Filed: Aug. 10, 2012

(65) Prior Publication Data

US 2013/0050722 A1  Feb. 28, 2013

(51) Int. Cl.
*H04N 1/60* (2006.01)
*G03F 3/08* (2006.01)
*H04N 1/407* (2006.01)
*H04N 1/46* (2006.01)

(52) U.S. Cl.
CPC . *H04N 1/46* (2013.01); *H04N 1/407* (2013.01)
USPC ............................................ 358/1.9; 358/518

(58) Field of Classification Search
None
See application file for complete search history.

(56) References Cited

U.S. PATENT DOCUMENTS

2004/0233472 A1* 11/2004 Gassho et al. ............... 358/1.15
2011/0235126 A1* 9/2011 Miyamoto ................... 358/3.06

FOREIGN PATENT DOCUMENTS

JP  2005321570  11/2005
JP  2006001223 A * 1/2006

* cited by examiner

*Primary Examiner* — Barbara Reinier
*Assistant Examiner* — Christopher D Wait
(74) *Attorney, Agent, or Firm* — Fitzpatrick, Cella, Harper & Scinto

(57) ABSTRACT

The image forming apparatus includes: a log obtaining unit configured to obtain a print log which is an execution history of a print job; a color utilization ratio obtaining unit configured to obtain a color utilization ratio which is a ratio of chromatic color material utilization when past print jobs were executed from the print log obtained by the log obtaining unit; a determination unit configured to determine to perform mixed color correction and single color correction when the color utilization ratio obtained by the color utilization ratio obtaining unit is equal to or larger than a threshold value and to perform the single color correction without performing the mixed color correction when the color utilization ratio is smaller than the threshold value; and a correction unit configured to perform the correction determined by the determination unit.

7 Claims, 26 Drawing Sheets

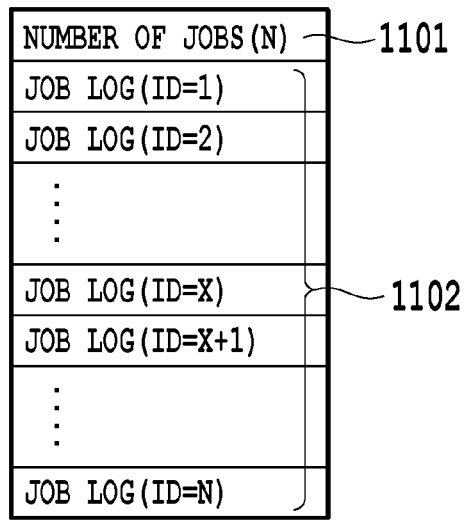

FIG.11A

| ID | X |
|---|---|
| JOB TYPE | PRINT |
| START TIME | 2011/2/28 13:24 |
| END TIME | 2011/2/28 13:28 |
| PRODUCT NAME | XXXXXX |
| IP ADDRESS | 172.24.152.155 |
| DOCUMENT NAME | Sunsetjpg |
| COMPUTER NAME | PC-2011-xxx |
| JOB OWNER NAME | hsato |
| TOTAL NUMBER OF PAGES | 50 |
| TOTAL NUMBER OF COLOR PAGES | 3 |
| TOTAL NUMBER OF BLACK-AND-WHITE PAGES | 47 |
| NUMBER OF COLOR COUNT IMPOSITIONS(A3) | 0 |
| NUMBER OF COLOR COUNT IMPOSITIONS(A4) | 3 |
| NUMBER OF COLOR IMPOSITIONS FOR EACH PAPER SIZE | |
| NUMBER OF BLACK-AND-WHITE COUNT IMPOSITIONS(A3) | 0 |
| NUMBER OF BLACK-AND-WHITE COUNT IMPOSITIONS(A4) | 47 |
| NUMBER OF BLACK-AND-WHITE IMPOSITIONS FOR EACH PAPER SIZE | |

FIG.11B

|  | COLOR (PC) | BLACK-AND-WHITE (PB) | TOTAL (PT) | COLOR UTILIZATION RATIO (P) |
|---|---|---|---|---|
| User_1 | 25 | 125 | 150 | 17% |
| User_2 | 30 | 35 | 65 | 46% |
| User_3 | 55 | 387 | 442 | 12% |
| ⋮ | ⋮ | ⋮ | ⋮ | ⋮ |
| User_x | 20 | 35 | 55 | 36% |

FIG.15

| COLOR UTILIZATION RATIO [P] | MIXED COLOR CORRECTION EXECUTION FREQUENCY |
|---|---|
| 0%~10% | NO EXECUTION |
| 10%~40% | ONCE IN 50 TIMES |
| 41%~50% | ONCE IN 20 TIMES |
| 50% OR HIGHER | ONCE IN 10 TIMES |

FIG.17A

| RATIO OF USERS EXCEEDING THRESHOLD VALUE [PU] | MIXED COLOR CORRECTION EXECUTION FREQUENCY |
|---|---|
| 0%~10% | NO EXECUTION |
| 10%~40% | ONCE IN 50 TIMES |
| 41%~50% | ONCE IN 20 TIMES |
| 50% OR HIGHER | ONCE IN 10 TIMES |

FIG.17B

| | |
|---|---:|
| ID | X |
| JOB TYPE | PRINT |
| START TIME | 2011/2/28 13:24 |
| END TIME | 2011/2/28 13:28 |
| PRODUCT NAME | XXXXXX |
| IP ADDRESS | 172.24.152.155 |
| DOCUMENT NAME | Sunsetjpg |
| COMPUTER NAME | PC-2011-xxx |
| JOB OWNER NAME | hsato |
| TOTAL NUMBER OF PAGES | 50 |
| TOTAL NUMBER OF COLOR PAGES | 3 |
| TOTAL NUMBER OF BLACK-AND-WHITE PAGES | 47 |
| NUMBER OF COLOR COUNT IMPOSITIONS(A3) | 0 |
| NUMBER OF COLOR COUNT IMPOSITIONS(A4) | 0 |
| : | |
| NUMBER OF BLACK-AND-WHITE COUNT IMPOSITIONS(A3) | 0 |
| NUMBER OF BLACK-AND-WHITE COUNT IMPOSITIONS(A4) | 47 |
| : | |
| NUMBER OF MONO-COLOR COUNT IMPOSITIONS(A3) | 0 |
| NUMBER OF MONO-COLOR COUNT IMPOSITIONS(A4) | 3 |
| : | |
| COLOR OF MONO-COLOR | Red |
| TOTAL OF MONO-COLOR | 3 |

FIG.21

IMAGE FORMING APPARATUS, IMAGE FORMING METHOD, AND DOCUMENT MANAGEMENT SYSTEM CAPABLE OF EXECUTING COLOR CORRECTION

BACKGROUND OF THE INVENTION

1. Field of the Invention

The present invention relates to color correction in an image forming apparatus.

2. Description of the Related Art

A color image forming apparatus employing an electronic photographing method, such as a color printer and a color copier, is required to provide a further higher output image quality. In such a situation, a gray scale of image density and stability thereof are known to have a significant influence to human determination whether image quality is satisfactory or not.

For this point, an image density varies according to variation caused by environmental change and long-term use in each part of an apparatus, and, particularly in the case of the color image forming apparatus using the electronic photographing method, the density variation is caused even by a minimal environmental variation and there is a problem that color balance is broken. Accordingly, it is necessary to have a means for always maintaining a constant density-gray scale characteristic. Therefore, the color image forming apparatus is provided with a gray scale correction means such as a lookup table (LUT) for each toner. This gray scale correction means optimizes a process condition such as an exposure amount and a development bias and selects the most appropriate value for the gray scale correction according to absolute humidity measured by a temperature-humidity sensor. Further, density control (calibration) using a density sensor is also performed so as to obtain the constant density-gray scale characteristic even when the variation occurs in each part of the apparatus. This calibration generates a density detection patch using each color toner on an intermediate image transfer body, a drum, or the like, detects the density of the unfixed patch by the density sensor, and feeds back the detection result to the process condition such as the exposure amount and the development bias.

The above described calibration is performed by detecting the unfixed patch formed on the intermediate image transfer body, the drum, or the like. However, it is known that the color balance is also changed by an image transfer efficiency when a toner image is transferred onto a recording medium such as a paper and by heating and pressure application in fixing. Accordingly, the above calibration cannot accommodate up to the color balance change of an image caused by the image transfer to the recording medium and the fixing. Further, in the electronic photographing method, even when the density correction is performed for a single color of cyan (C), magenta (M), yellow (Y), or black (K) and each density is stabilized, sometimes a color deviation is caused in a mixed color of a combination thereof.

Accordingly, there is an image forming apparatus including a sensor (color sensor or spectrum sensor) that detects density, chromaticity, and spectrum reflectivity of the patch images on a recording medium after gray scale patches of single colors of CMYK and a mixed color patch thereof are formed and fixed on the recording medium. Such an image forming apparatus can perform more precise mixed color correction by a multi-dimensional LUT generated using values read out by the sensor. Further, manual read-out operation performed so far using a reader-scanner becomes unnecessary. Therefore, there is an advantage of executing calibration processing automatically for a user who cannot secure a manager or the like, a user who wants to reduce operator cost (human cost) and a user who does not have sufficient knowledge for the correction. In this manner, the mixed color correction using a sensor is expected to provide a more precise result than the single color correction and has an advantage of performing the calibration without human work.

On the other side, there has been a problem that the mixed color correction using a sensor needs a longer time for the correction than the single color correction and consumes a lot of paper and toner for patch pattern printing. For example, a user who mostly treats typical office documents and seriously considers cost reduction, desires to restrict execution of the mixed color correction, which consumes a lot of toner and time, as far as possible.

For satisfying such a desire, a technique is proposed as disclosed in patent document 1, for example. Japanese Patent Laid-Open No. 2005-321570 discloses a technique realizing color correction in a desired preciseness by enabling a combination in a patch group, which is to be read out by a sensor, to be changed according to a user's instruction in an image forming apparatus using a mixed-color multi-dimensional LUT, for suppressing excessive consumption of resources and time.

However, in the technique described in Japanese Patent Laid-Open No. 2005-321570, an operator needs to designate a color correction preciseness, and the user's desire to reduce the human cost is not satisfied sufficiently. Further, sometimes the color correction preciseness designated by the operator does not fit job contents to be actually utilized.

SUMMARY OF THE INVENTION

An image forming apparatus according to the present invention is characterized by including a log obtaining unit configured to obtain a print log which is an execution history of a print job; a color utilization ratio obtaining unit (803) configured to obtain a color utilization ratio which is a ratio of chromatic color material utilization when past print jobs were executed from the print log obtained by the log obtaining unit; a determination unit configured to determine to perform mixed color correction and single color correction in the case that the color utilization ratio obtained by the color utilization ratio obtaining unit is equal to or larger than a threshold value and to perform the single color correction without performing the mixed color correction in the case that the color utilization ratio is smaller than the threshold value; and a correction unit configured to perform the correction determined by the determination unit.

According to the present invention, the most appropriate color correction of an image forming apparatus is determined and executed automatically in consideration of a utilization situation thereof. Thereby, it becomes possible to save time required for the calibration and reduce cost such as paper, toner, and human power.

Further features of the present invention will become apparent from the following description of exemplary embodiments (with reference to the attached drawings).

BRIEF DESCRIPTION OF THE DRAWINGS

FIG. 11A is a diagram for explaining a data structure of a print log, and FIG. 11B is a diagram showing an example of the log for each job;

FIG. 15 is a table showing an example of a color utilization ratio for each user;

FIG. 17A is an example of a table showing an execution frequency of mixed color correction according to a color utilization ratio [P], and FIG. 17B is an example of a table showing an execution frequency of the mixed color correction according to a ratio of user exceeding a threshold value [PU];

FIG. 19A shows a main dialog and FIGS. 19B and 19C show a sub-dialog;

FIG. 21 is a diagram showing an example of a print log;

DESCRIPTION OF THE EMBODIMENTS

Hereinafter, modes for executing the present invention will be explained by the use of the drawings.

Embodiment 1

Figure 1:
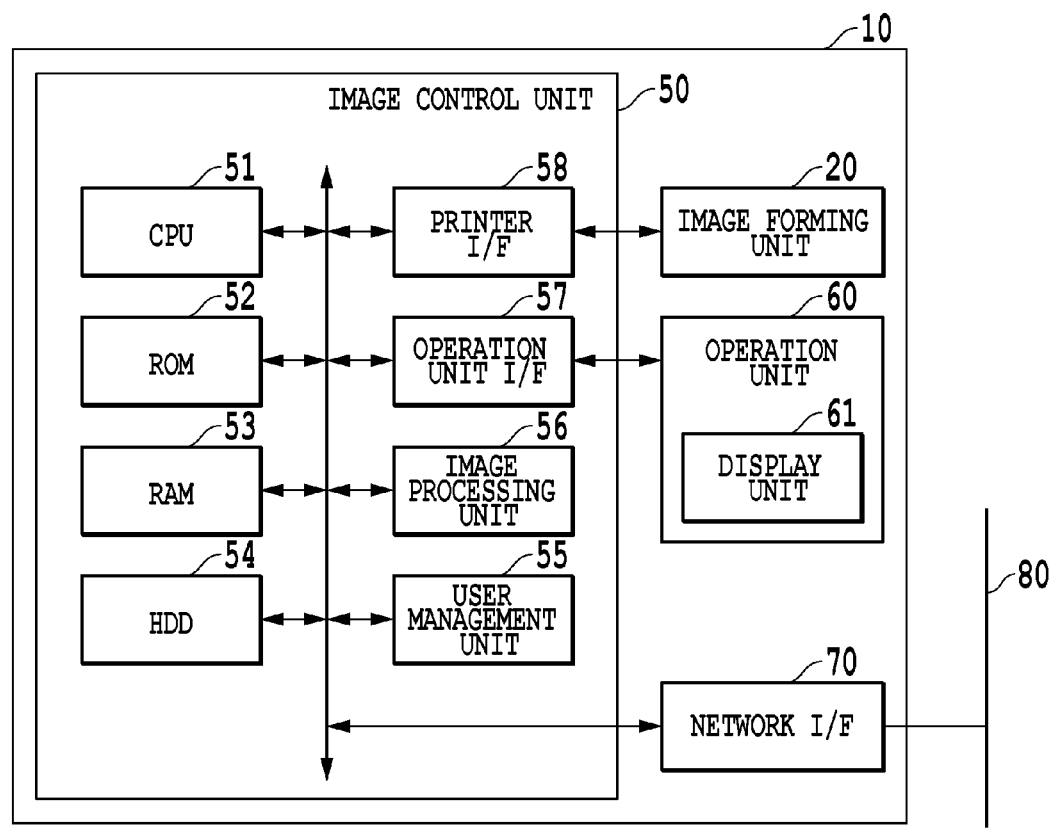
FIG. 1 is a block diagram showing a major constituent of a printer as an image forming apparatus according to embodiment 1.

FIG. 1 is a block diagram showing a main constituent of a printer as an image forming apparatus according to the present embodiment.

An image forming apparatus 10, which is a printer, is configured with an image forming unit 20, an image control unit 50, an operation unit 60, and a network I/F 70.

The image forming unit 20 performs processing of forming a color image onto a recording medium such as a paper according to image-processed image data. Details of the image forming unit 20 will be described later.

The image control unit 50 is configured with a CPU 51, a ROM 52, a RAM 53, an HDD 54, a user management unit 55, an image processing unit 56, an operation unit I/F 57, and a printer I/F 58.

The processor (CPU) 51, which controls the individual units in an integrated manner, reads out a control program stored in the ROM 52, and executes various kinds of control processing such as print control.

The ROM 52 stores various kinds of instruction (OS, application program, and the like) to be executed in the CPU 51.

The RAM 53 is used as a main memory and a temporary storage region such as a work area for the CPU 51. The RAM 53 includes a recording part which is a region storing a correction mode to be described later, various kinds of setting value, an execution history of calibration, and the like, and a log part which is a region retaining a print job history (print log) and the like. Note that the recording part and the log part may be configured to be provided in the HDD 54 instead of the RAM 53.

The HDD 54 is a hard disk drive to be used as a storage region of a program to be read out to the RAM 53, an execution result, and the like.

The user management unit 55 stores and manages user information of the image forming apparatus 10 such as a user ID and a password. The user information is used for user authentication in login.

The image processing unit 56 generates the image data to be used in the image forming unit 20, and performs PDL coded bit map image development, image compression-decompression processing and resolution conversion for JPEG of multi-value image data and JBIG, MMR, MR, and MH of binary image data, and the like.

The operation unit I/F 57 interfaces with the operation unit 60 in which a user performs various kinds of instruction and operation.

The printer I/F 58 interfaces with the image forming unit 20.

For the operation unit 60 in which the user performs various kinds of operation instruction, there are various types from a type including only a switch and an LED to a type including a touch panel type LCD display unit. Information input into the operation unit 60 is transferred to the CPU 51 via the operation unit I/F 57, and, after desired processing has been executed, a processing result thereof and the like are displayed on the display unit 61 provided in the operation unit 60.

The network I/F 70 interfaces with a network 80 such as LAN. The image forming apparatus 10 is connected to a computer and the like (not shown in the drawing) on the network 80 via the network I/F 70.

Note that the image forming apparatus 10 is not limited to a printer and may be a multi-function printer provided with functions of copier, scanner, FAX, and the like.

Figure 2:
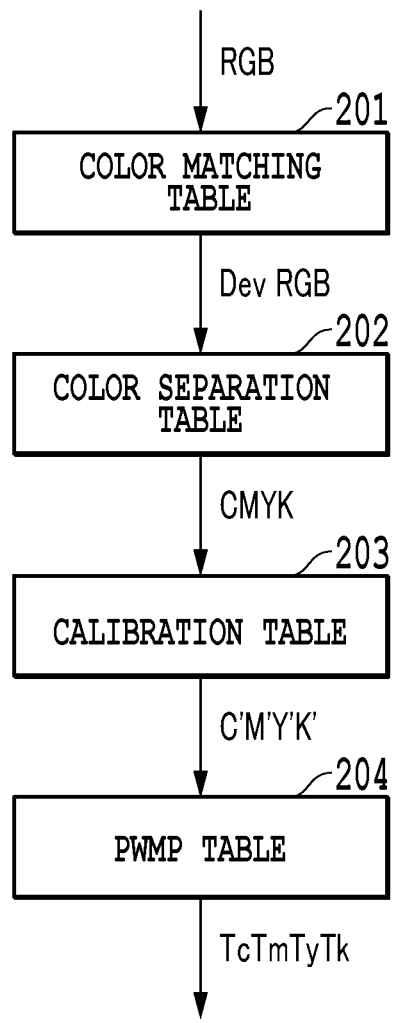
FIG. 2 is a block diagram showing a flow of color space conversion processing in an image processing unit.

Next, color space conversion processing of the image processing unit 56 in the image control unit 50 will be explained. FIG. 2 is a block diagram showing a flow of the color space conversion processing in the image processing unit 56.

First, the image processing unit 56 converts an RGB signal received from the not-illustrated computer or the like into a device RGB (DevRGB) signal suitable for a color reproduction range of the image forming apparatus 10 using a preliminarily prepared color matching table (201).

Then, the image processing unit 56 converts the DevRGB signal into a CMYK signal which expresses toner color materials of the image forming apparatus 10, using a preliminarily prepared color separation table (202).

Next, the image processing unit 56 converts the CMYK signal into a C'M'Y'K' signal applied with density-gray scale characteristic correction, using a calibration table which corrects a density-gray scale characteristic specific to the image forming apparatus 10 (203).

Lastly, the image processing unit 56 converts the C'M'Y'K' signal into exposure times of Tc, Tm, Ty, and Tk in scanner units (24C, 24M, 24Y, and 24K to be described later), using a PWM (Pulse Width Modulation) table (204).

In this manner, the image processing unit 56 performs the color space conversion processing.

Figure 3:
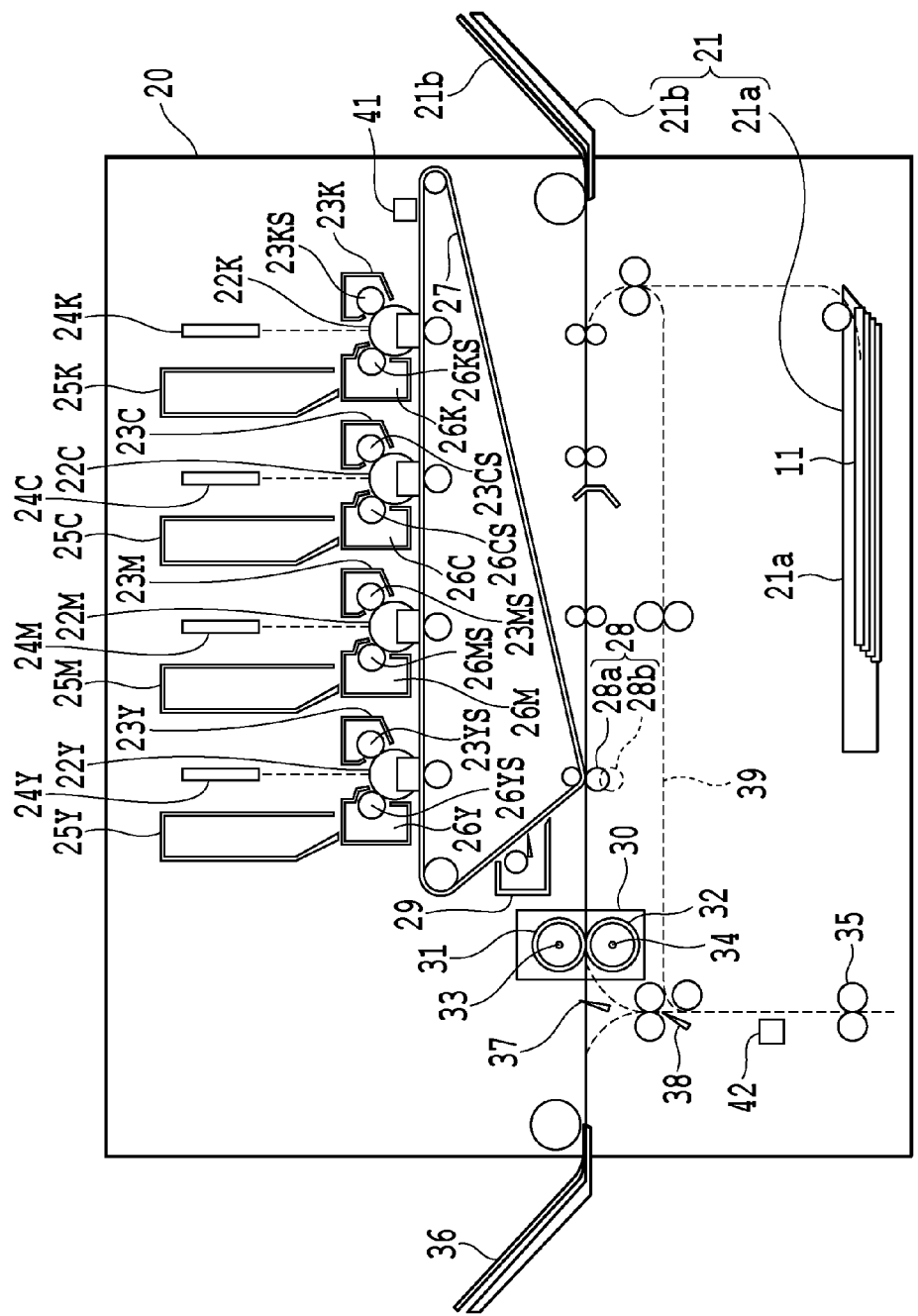
FIG. 3 is a diagram showing an internal structure of an image forming unit employing an electronic photographing method.

Next, details of the image forming unit 20 according to the present embodiment will be explained. FIG. 3 is a diagram showing an internal structure of the image forming unit 20 employing the electronic photographing method.

The image forming unit 20 forms an electrostatic latent image by exposure light lit for an exposure time according to the image signal and forms a single color toner image by developing this electrostatic latent image. Then, the image forming unit 20 forms a multi-color toner image by overlapping these single color toner images, transfers the formed multi-color toner image onto a recording medium 11 such as a paper, and fixes the transferred multi-color toner image. The image forming unit 20 is configured with a paper feed unit 21, photoconductors 22Y to 22K, injection chargers 23Y to 23K, toner cartridges 25Y to 25K, developers 26Y to 26K, an intermediate image transfer body 27, an image transfer roller 28, a cleaning means 29, a fixing unit 30, a density sensor 41, and a spectrum sensor 42. Then, the paper feed unit 21 is configured with a paper feed cassette 21a and a manual paper feed tray 21b.

Each of the photoconductive drums (photoconductors) 22Y to 22K includes an aluminum cylinder on the outer perimeter of which an organic photo-conductive layer is coated, and this cylinder rotates in the counter-clockwise direction according to image formation operation by a not-illustrated drive motor. The injection chargers 23Y to 23K are temporary charging means for charging respective photoconductors of yellow (Y), magenta (M), cyan (C), and black (K). The injection chargers are provided with sleeves 23YS to 23KS, respectively.

It is configured such that exposure light beams to the photoconductive drums 22Y to 22K are sent from the scanner units 24Y to 24K, and the electrostatic latent image is formed by selective exposure on each surface of the photoconductive drums 22Y to 22K. The developers 26Y to 26K are development means for visualizing the electrostatic latent image for yellow (Y), magenta (M), cyan (C), and black (K), respectively. The developers are provided with sleeves 26YS to 26KS, respectively. Further, each of the developers is attached detachably.

The intermediate image transfer body 27 provided in contact with the photoconductive drums 22Y to 22K rotates in the clockwise direction along with the rotation of the photoconductive drums 22Y to 22K in the image formation and transfers the single color toner image. After that, the image transfer roller 28 to be described later contacts the intermediate image transfer body 27, sandwiches and conveys a recording medium 11, and transfers the multi-color toner image formed on the intermediate image transfer body 27 onto the recording medium 11.

The image transfer roller 28 contacts the recording medium 11 at the position indicated by the reference numeral 28a during transferring the multi-color toner image onto the recording medium 11 and is separated to the position indicated by the reference numeral 28b after the print processing.

The fixing unit 30 melts and fixes the transferred multi-color toner image while conveying the recording medium 11 and is provided with a fixing roller 31 heating the recording medium 11 and a pressure roller 32 for bringing the recording medium 11 into pressure-contact with the fixing roller 31. The fixing roller 31 and the pressure roller 32 are formed in hollow shapes and include heaters 33 and 34 therein, respectively. Thereby, the recording medium 11 having the multi-color toner image is conveyed by the fixing roller 31 and the pressure roller 32 and also applied with heat and pressure to fix the toner image on the surface. After the fixing of the toner image, the recording medium 11 is ejected to a paper ejection unit (paper ejection tray) 36 by an ejection roller.

The cleaning means 29 cleans toner remaining on the intermediate image transfer body 27, and the waste toner is stored in a cleaner container after the four color multi-color toner image formed on the intermediate image transfer body 27 has been transferred onto the recording medium 11.

Figure 4:
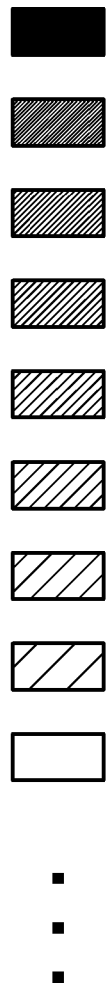
FIG. 4 is a diagram showing an example of a patch image formed on an intermediate image transfer body for density-gray scale characteristic control.

The density sensor 41 is disposed toward the intermediate image transfer body 27 and measures the density of a toner patch formed on the surface of the intermediate image transfer body 27. FIG. 4 is a diagram showing an example of a patch image formed on the intermediate image transfer body for density-gray scale characteristic control. Here, while only single color gray scale patches of an unfixed single color K toner are arranged, single color gray scale patches for individual toners C, M, and Y are also formed similarly. The density sensor 41 cannot discriminate the toner colors on the intermediate image transfer body 27. Therefore, the gray scale patches for the single color toner are formed on the intermediate image transfer body 27. After that, this density data is fed back to the calibration table correcting the density-gray scale characteristic in the image processing unit 56 and each of the process conditions in the image forming unit 20.

The spectrum sensor 42 is disposed toward the image formation surface of the recording medium 11 at a position after the fixing unit 30 in a recording medium conveying path (paper conveying path) in the image forming unit 20. That is, this sensor is disposed on the conveying path at a position from the fixing of the paper to the paper ejection in the image forming apparatus. Then, the sensor detects and measures the mixed color patch after the fixing formed on the recording medium 11 to obtain a spectrum value thereof. Here, the spectrum value is a value obtained from a spectrum reflectivity acquired by the patch measurement. The spectrum value is a color space value of the patch independent from a device, such as a density value, a reflectivity, a luminance value, and L*a*b* value or XYZ, for example. By reading out the mixed color patch image after the fixing, it become possible to improve the preciseness of the color matching and to correct the multiple-color variation which cannot be corrected perfectly only by using the single color patch. The spectrum sensor 42 can calculate an absolute chromaticity by reading out a not-illustrated white board disposed facing the sensor before the reading out of the mixed color patch image. After that, the mixed color patch image will be read out.

The patch image after the fixing formed on the recording medium 11 for the density-gray scale characteristic control may be single color gray scale patterns of C, M, Y, and K or a processed gray scale patch mixing the colors C, M, and Y.

Figure 5:
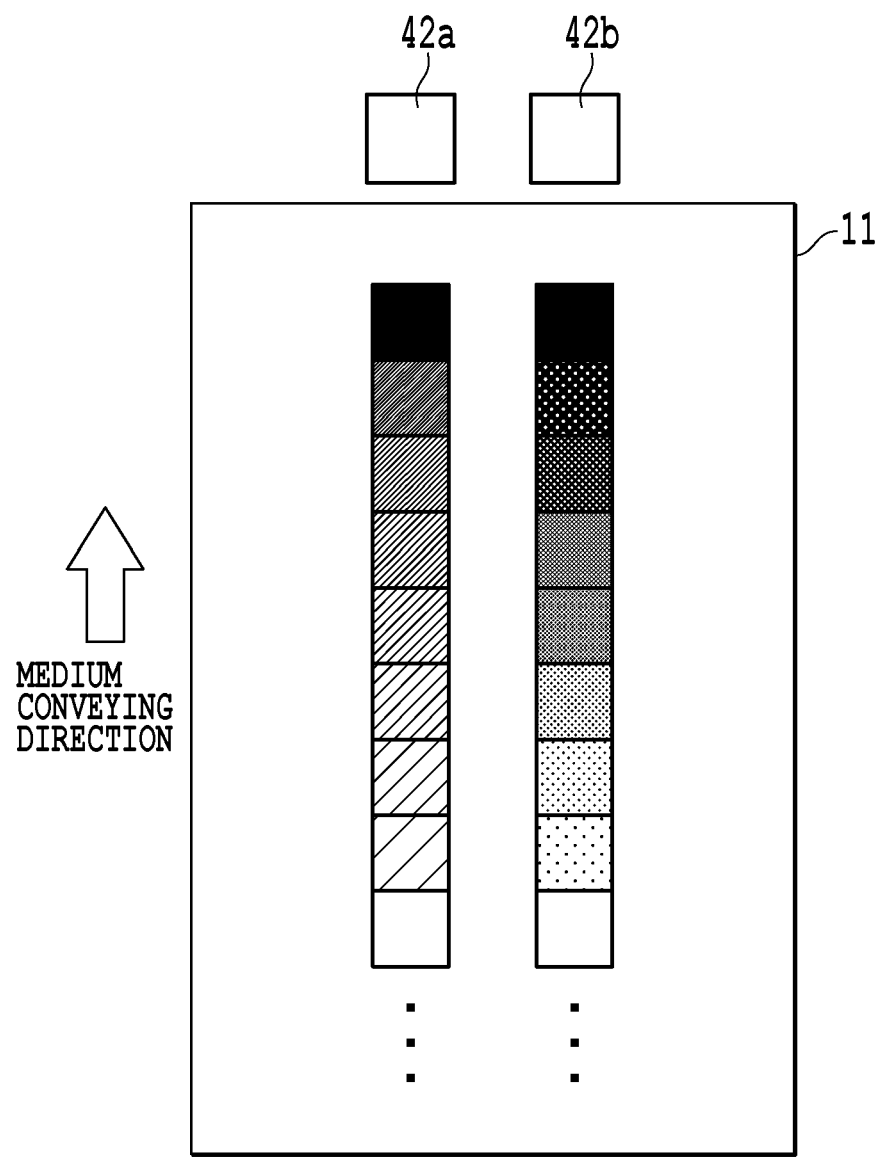
FIG. 5 is a diagram showing an example of a patch image after fixing formed on a recording medium for density-gray scale characteristic control.

FIG. 5 shows an example of the patch image after the fixing formed on the recording medium 11 for the density-gray scale characteristic control. The patch image for the density-gray scale characteristic control shown in FIG. 5 is formed by two-column patches using mixed color patches mixing C, M, Y, and K, and the color of this patch image is measured as described above by the two spectrum sensors 42a and 42b disposed in the main scan direction within the image forming unit 20.

When the mixed color patch is printed only on one side of the recording medium 11 and the recording medium 11 is ejected, after the fixing performed by the fixing unit 30, a flapper 37 provided immediately after the fixing unit 30 operates, thereby conveying the recording medium 11 output from the fixing unit 30 toward a reverse roller 35. Then, the spectrum sensor 42 disposed on a double-side conveying path performs color measurement of the spectrum value for the mixed color patch. After that, after the front end of the recording medium 11 has been input into the reverse roller 35, the rotation of the reverse roller 35 is reversed. Further, a double side flapper 38 operates in the direction of the paper ejection unit 36, thereby ejecting the recording medium 11 directly to the paper ejection unit 36. On the other hand, when the mixed color patches are printed on both surfaces of the recording medium 11 and the recording medium 11 is ejected, the recording medium 11 is conveyed in the same manner as in the case of the one side printing up to the reverse rotation of the reverse roller 35, in which the double side flapper 38 operates in the direction of a double side conveying path 39 to convey the recording paper 11 to the double side conveying path 39. After that, as in the image transfer onto the front surface, the image transfer roller 28 contacts the intermediate image transfer body 27 to sandwich and convey the recording medium 11 and a multi-color toner image on the intermediate image transfer body 27 is transferred onto the recording medium 11. After that, as in the case of the front surface, the recording medium 11 is once conveyed in the direction of the reverse roller 35 and subjected to the color measurement by the spectrum sensor 42, and then ejected to the paper ejection unit 36 by the reverse rotation of the reverse roller 35.

Next, operation control when the calibration is executed will be explained.

Figure 6:
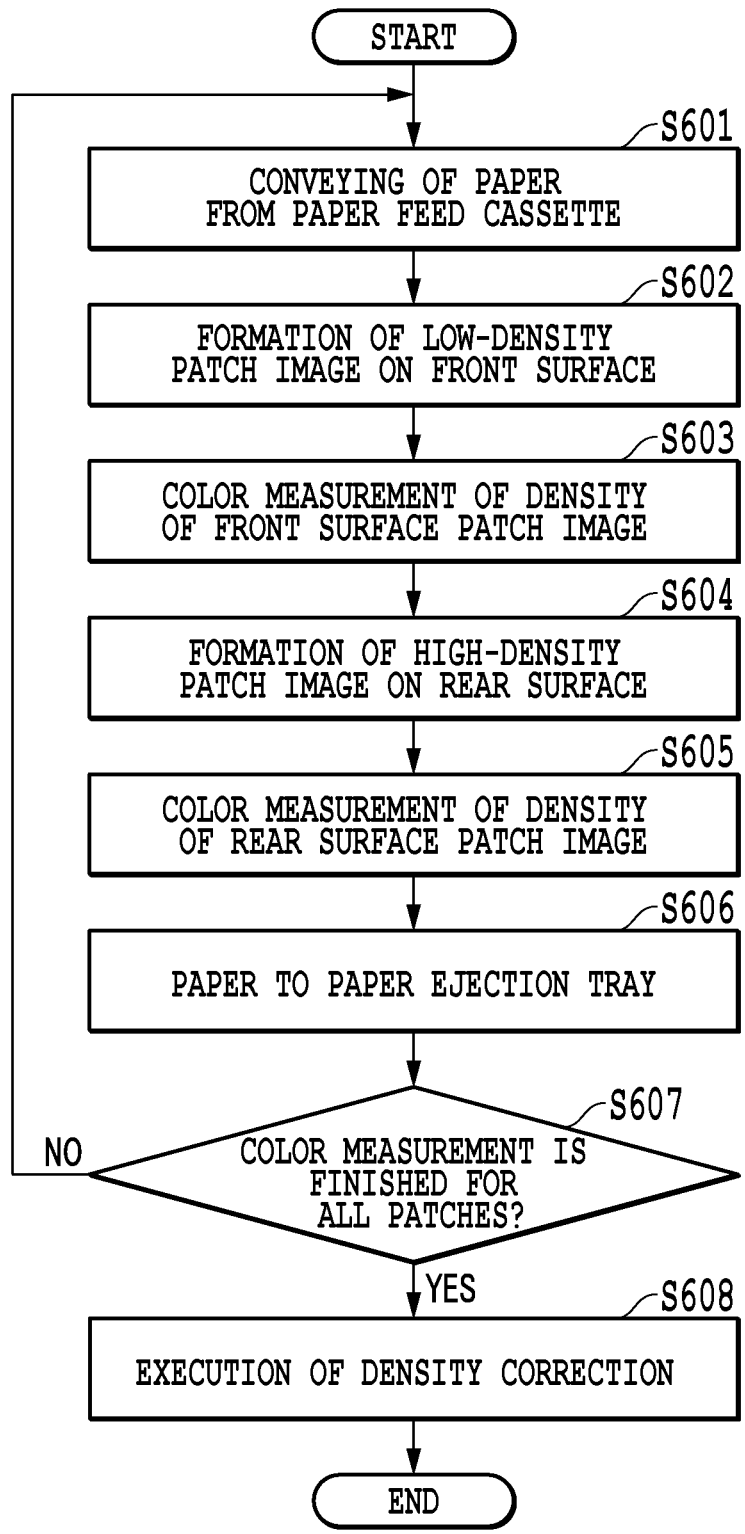
FIG. 6 is a flowchart showing a flow of multiple-color calibration control processing in an image forming apparatus which mounts a spectrum sensor.

FIG. 6 is a flowchart showing a flow of multiple-color calibration control processing in the image forming apparatus 10 mounting the spectrum sensor 42. This control processing is executed between normal print operations, and a program stored in the HDD 54 or the like is read out into the RAM 53 to be executed by the CPU 51, thereby realizing the control processing. There are two kinds of calibration; automatic calibration and manual calibration. The automatic calibration is calibration automatically executed when a preliminarily set condition such as environmental variation and the number of prints is satisfied. The manual calibration is calibration executed according to a user's operation instruction such as a user's execution instruction at optional timing. In the following, except for the case specified in particular, explanation will be provided assuming that the automatic calibration is set and a paper is used as the recording medium 11.

When the preliminarily set execution condition is satisfied for the automatic calibration, the CPU 51 conveys a paper from the paper feed cassette 21a to a print position in step 601.

Figure 7A:
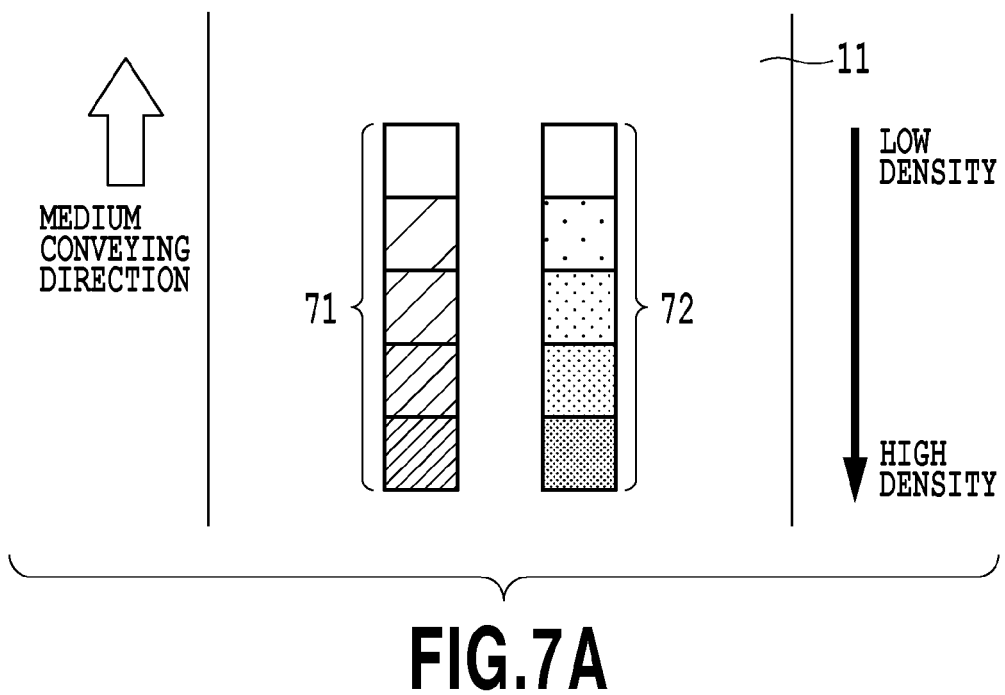
FIG. 7A is a diagram showing an example of a low-density patch image formed on a front surface of a paper.

In step 602, the CPU 51 forms a patch image as described above on the front surface of the paper. At this time, a low-density mixed color patch image is formed on the front surface of the paper. This is performed for the purpose of reducing the influence of a see-through image when another patch image is formed later on the rear surface of the paper and the patch image is subjected to the color measurement by the spectrum sensor 42. Basically, the influence of the see-through image is determined by a transmittance of the paper and a printed toner amount. Accordingly, a mixed color patch image, which has a density not higher than a predetermined density threshold value and provides no influence or little influence of the see-through image, is selected for the patch image formed on the front surface of the paper. In the stage of step 602, the patch image is not formed on the rear surface of the paper and the influence of the see-through image does not exist at all. FIG. 7A shows an example of the low-density patch image formed on the front surface of the paper. The two spectrum sensors 42 are disposed in the main scan direction in the present embodiment (refer to FIG. 5), and thereby two columns of the low-density mixed color patches (71 and 72) are formed. Then, in the low-density patch group, the patch positioned at the front end in the conveying direction has the lowest density and the patches are arranged so as to be shifted gradually to have a higher density. Note that the patch image in this case may be an image preliminarily stored in the ROM 52 or may be generated at the execution of the calibration. The paper, on the front surface of which the patch image is formed, is conveyed to a position where the spectrum sensor 42 is provided, via the fixing unit 30.

In step 603, the CPU 51 measures the spectrum reflectivity of the patch image formed on the front surface of the paper using the spectrum sensor 42. After the measurement has been finished, the reverse roller 35 rotates reversely and the paper is conveyed to the print position for printing on the rear surface, via the double side conveying path 39.

Figure 7B:
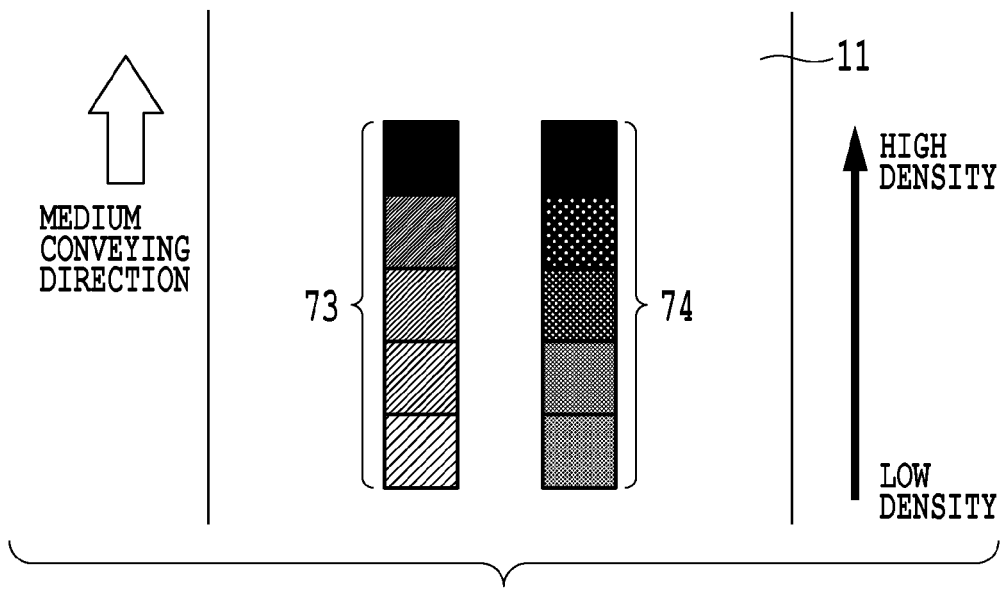
FIG. 7B is a diagram showing an example of a high-density patch image formed on the rear surface of the paper.

In step 604, the CPU 51 forms a patch image on the rear surface of the paper. The patch image formed here is a high-density patch image. FIG. 7B shows an example of the high-density patch image formed on the rear surface of the paper. As on the front surface, two columns of the high-density mixed color patches (73 and 74) are formed. Then, in the high-density patch image, the patches are arranged so as to compensate the influence of the see-through image from the patch image already formed on the front surface. That is, even in the high-density patch group, the patch positioned at the front edge in the conveying direction has the highest density, and the patches are arranged so as to be shifted gradually to have a lower density. In this case, while the best efficiency is obtained when the number of the patches is the same between the patch image formed on the front surface of the paper and the patch image formed on the rear surface, the total number of the patches may be different between the front surface and the rear surface, for a density threshold value providing little influence of the see-through image. The paper on the rear surface of which the patch image is formed is conveyed again to the position where the spectrum sensor 42 is disposed, via the fixing unit 30.

In step 605, the CPU 51 measures the spectrum reflectivity of the patch image formed on the rear surface of the paper by the spectrum sensor 42.

In step 606, the CPU 51 ejects the paper after the measurement to the paper ejection unit 36.

In step 607, the CPU 51 determines whether the measurement has been finished or not for all the patch images. When the measurement has been finished for all the patch images, the process proceeds to step 608. On the other hand, when the measurement has not been finished for all the patch images, the process returns to step 601 and repeats each of the processing steps in step 601 to step 606. Then, the CPU 51 obtains the density of the patch from each of the measured spectrum reflectivity values.

In step 608, the CPU 51 corrects the CMYK density using the calibration table for correcting the density-gray scale characteristic.

Figure 8:
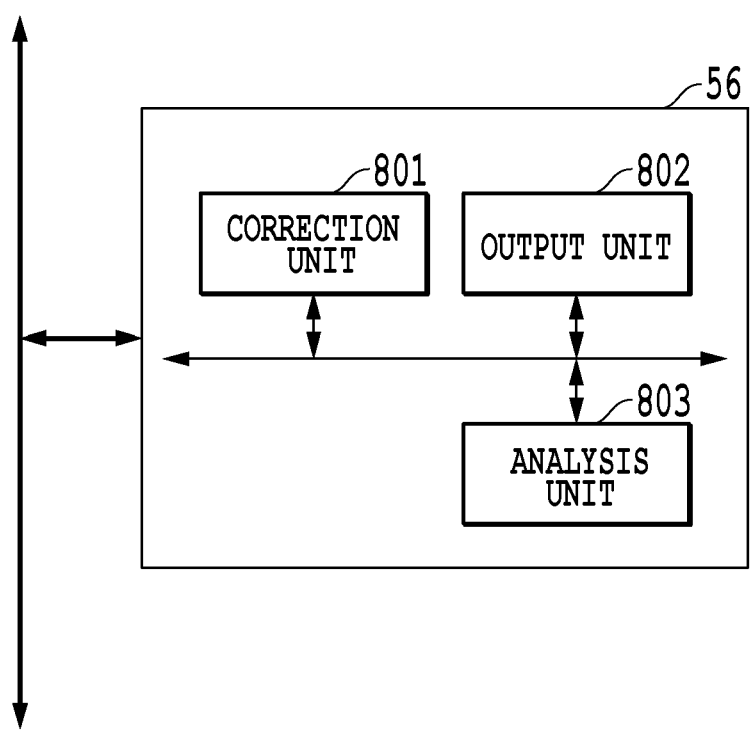
FIG. 8 is a block diagram showing an internal structure of an image processing unit.

Next, the image processing unit 56 in the image control unit 50 will be explained in detail. FIG. 8 is a block diagram showing an internal configuration of the image processing unit 56.

Reference numeral 801 indicates a correction unit executing the color correction. This correction unit 801 has an idling state after the image forming apparatus 10 has been activated, and reads in correction mode information from the recording part of the RAM 53 when a correction flag to be described later (flag for instructing whether or not to execute the calibration) has been set to ON. Then, the correction unit 801 executes the calibration according to the read-in correction mode. When the calibration has been completed, the correction unit 801 writes the execution history of the calibration into the recording part of the RAM 53 and returns to the idling state. In the automatic calibration, when a preliminarily set condition is satisfied, for example, after a predetermined number of pages have been printed, after a certain time has elapsed, or after a predetermined number of jobs have been printed, the calibration is assumed to be executed periodically.

Reference numeral 802 indicates an output unit. Note that actual output material is obtained through the image forming unit 20. The output unit 802 has an idling state after the image forming apparatus 10 has been activated, executes printing (instructs the image forming unit 20 to execute printing) when having received a print request event, and writes a log corresponding to the print processing into the log part when the printing has been completed. When having finished the write-in to the log part, the output unit 802 notifies an analysis unit 803 of the log write-in event. Note that the log includes a print log and an image log and details will be described later.

Reference numeral 803 indicates an analysis unit, and the analysis unit 803 performs log analysis according to the correction mode set by the user and performs processing of determining the contents of the calibration and determining whether or not to execute the calibration.

Figure 9:
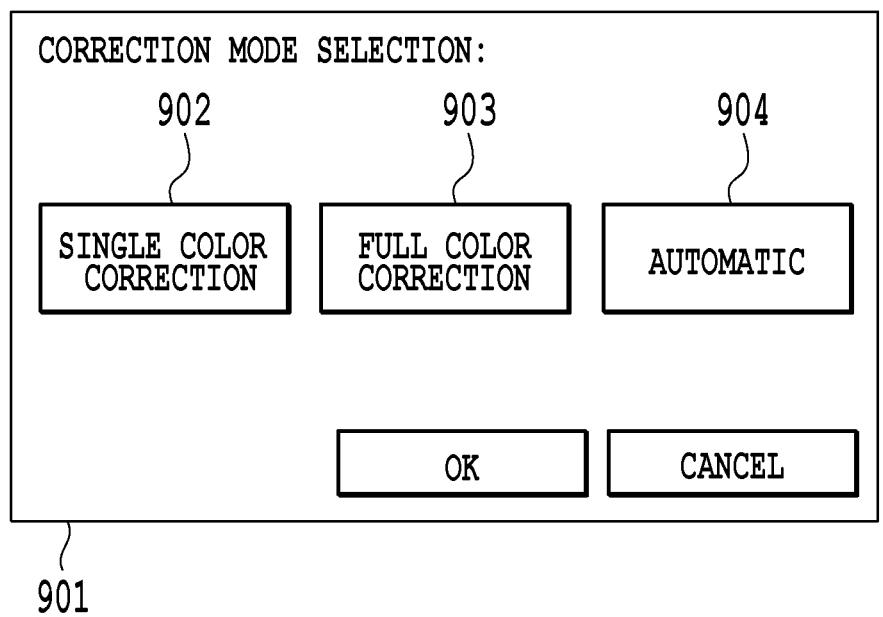
FIG. 9 is a diagram showing an example of a user interface for setting a correction mode.

Here, the correction mode will be explained. The correction mode in the present embodiment includes three kinds of correction mode; a "single color correction mode" performing the calibration by single color correction, a "full color correction mode" performing the calibration by mixed color correction, and an "automatic selection mode" selecting the single color correction or the full color correction automatically. By the way, when the mixed color correction is performed, the single color correction is performed first and then the mixed color correction is performed. Accordingly, the full color correction mode needs a longer time for the correction and a larger amount of consumption material to be utilized (paper and toner) than the single color correction mode. FIG. 9 shows an example of a user interface displayed on the display unit 61 for setting the correction mode. In FIG. 9, reference numeral 901 indicates a correction mode setting screen, and a "single color correction button" 902 designating the single color correction mode, a "full color correction button" 903 designating the full color correction mode, and an "automatic button" 904 designating the automatic selection mode are provided. When the single color correction button 902 or the full color correction button 903 is selected, the calibration having the selected contents is always executed regardless of a device utilization situation. On the other hand, when the automatic button 904 is selected, the most appropriate color correction is selected and executed automatically in consideration of the device utilization situation. In the following, except for the case specified in particular, explanation will be provided assuming that the automatic selection mode is set.

The analysis unit 803 analyzes the log and performs processing of determining the contents of the calibration when the above described automatic selection mode is set. That is, the analysis unit 803 executes the log analysis when having received the log write-in event, determines correction contents according to the analysis result, and retains the determined correction contents (single color correction or mixed color correction) in the recording part. After that, the correction flag is set to ON when it is correction execution timing.

Note that, while, in the present embodiment, each of the above units is configured to operate in the image processing unit 56, a program may be configured to be developed in the RAM 53 or the HDD 54 to cause each of the units to operate.

Figure 10:
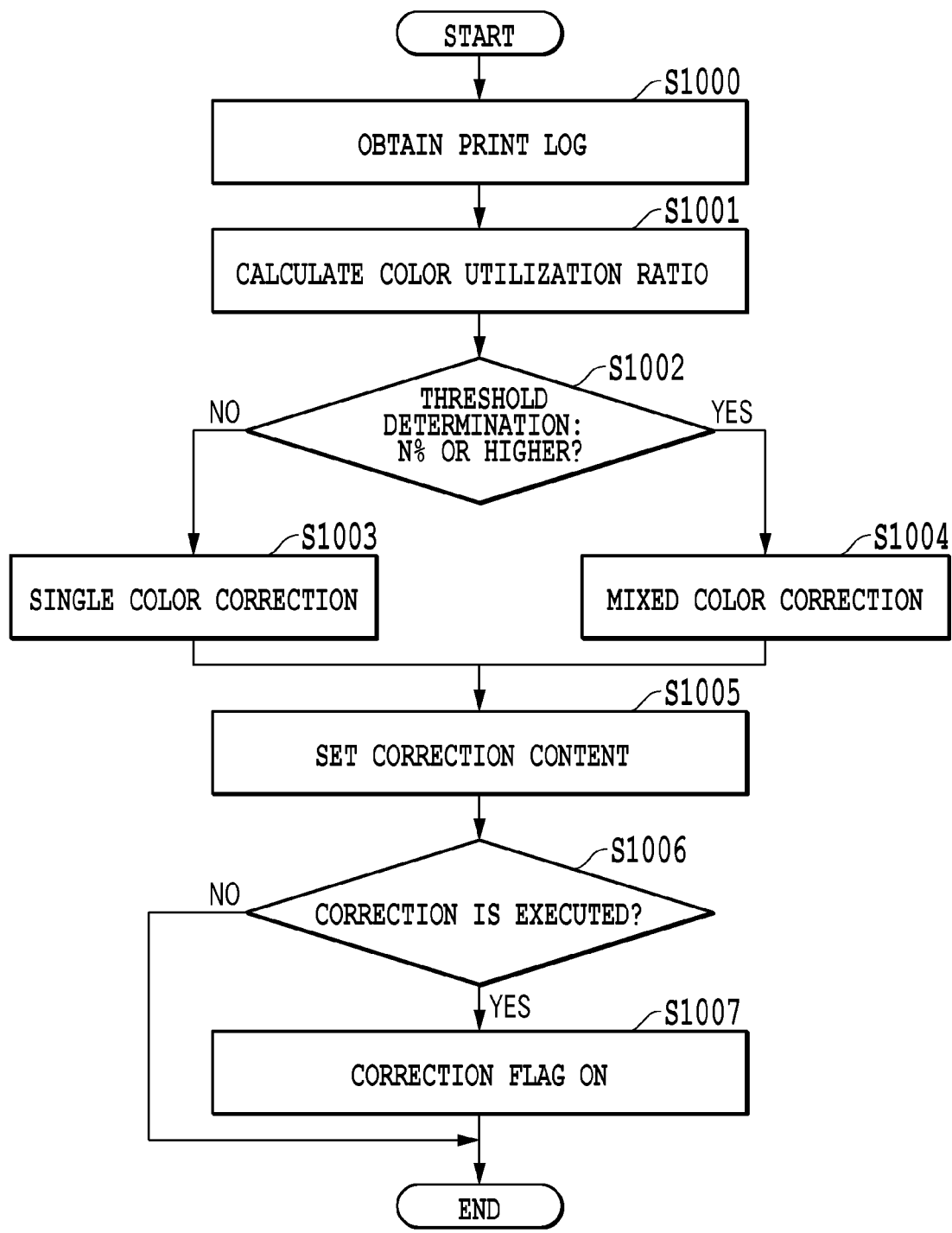
FIG. 10 is a flowchart showing a processing flow in an analysis unit according to embodiment 1.

FIG. 10 is a flowchart showing a processing flow of the analysis unit 803 of the present embodiment.

In step 1000, the analysis unit 803 obtains the print log from the log part of the RAM 53. FIGS. 11A and 11B are diagrams explaining the print log obtained in this step. FIG. 11A shows a data structure of the print log, and the total number of jobs N (1101) is followed by a log of each job (job log) and one ID (1102) is allotted to one "job log" to control the job log. FIG. 11B shows an example of the contents of the "job log" and various kinds of information are retained such as a job ID, a kind of job, start time, end time, a job owner name, the total number of pages in a job, the total number of color pages in a job and the number of impositions for each paper size, the total number of black-and-white pages and the total number of impositions for each paper size. After having obtained the log, the process proceeds to step 1001.

In step 1001, the analysis unit 803 obtains a ratio of color printing in which the printing is performed using chromatic color material (color utilization ratio) from the obtained print log. The color utilization ratio in the present embodiment is obtained as a ratio of the number of color pages to the total number of pages in jobs to be analyzed. A formula for obtaining the color utilization ratio here is given as follows.

Color utilization ratio $[P](\%) = ($Number of color pages $[PC]/$Total number of pages $[PT]) \times 100$ Here, Number of color pages $[PC] =$ Total number of pages $[PT] -$ Number of black-and-white pages $[PB]$ For example, when the number of jobs to be analyzed is 10 jobs, the total number of pages [PT] of the 10 jobs is 100 pages, and the number of black-and-white pages [PB] therein is 70 pages, Color utilization ratio $[P] = ((100-70)/100) \times 100 = 30$ (%)

Further, if a method other than this formula is available for obtaining the color utilization ratio, a value obtained by the method may be used.

Figure 12A:
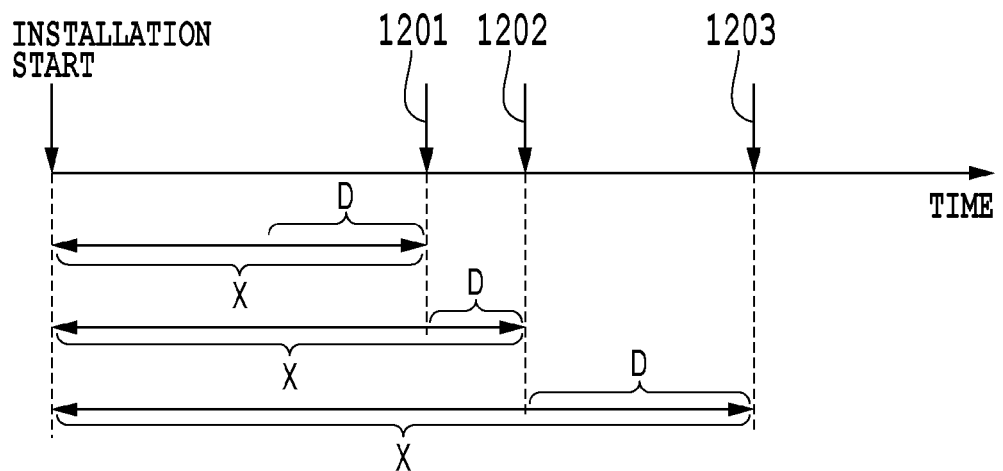
FIG. 12A and FIG. 12B are diagrams showing examples of a job range to be analyzed.
Figure 12B:
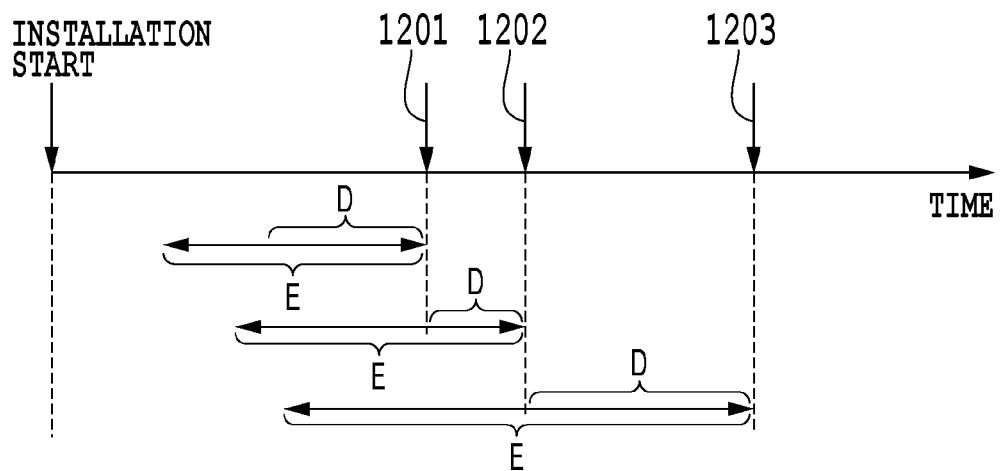

Here, the job to be analyzed in this step will be explained by the use of FIGS. 12A and 12B. In FIGS. 12A and 12B, [D] indicates a predetermined number of jobs as a condition defining execution timing of the calibration, [X] and [E] indicate job ranges for an analysis target. In FIG. 12A, all the jobs traced back from a calibration execution point are included in the analysis target range, and, in FIG. 12B, the jobs in a certain range traced back from the calibration execution point is included in the analysis target range. Reference numerals 1201 to 1203 indicate correction execution events, respectively. Note that the predetermined number of jobs [D] and the job range for the analysis target, while being assumed to be preliminarily set by the user and retained in the recording part, may be set optionally via a not-illustrated user interface.

Explanation will return to the flowchart of FIG. 10.

Figure 13:
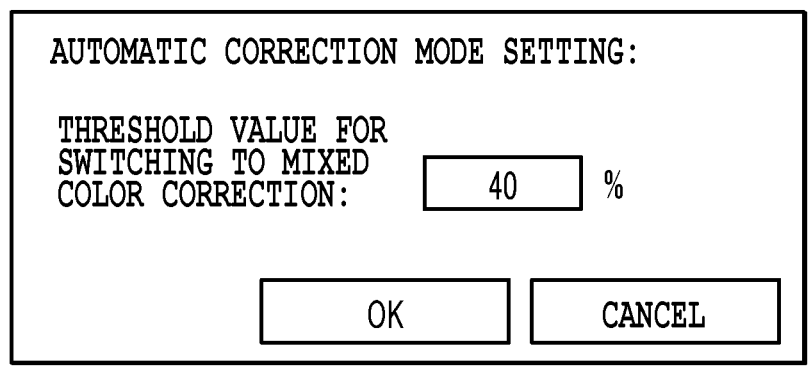
FIG. 13 is a diagram showing an example of a user interface for changing threshold value setting.

In step 1002, the analysis unit 803 compares the obtained color utilization ratio [P] with a preliminarily set threshold value (e.g., 40%), and determines whether the obtained color utilization ratio [P] exceeds the threshold value or not. Here, the threshold value is assumed to be retained preliminarily in the recording part, and may be configured to be unchangeable as a fixed value or may be configured to be changeably set optionally by the user. FIG. 13 is a diagram showing an example of a user interface when the threshold value can be set changeably by the user.

When the color utilization ratio [P] is determined not to exceed the preliminarily set threshold value, the analysis unit 803 goes to step 1003. On the other hand, when the obtained color utilization ratio [P] is determined to exceed the preliminarily set threshold value, the process proceeds to step 1004.

In step 1003, the analysis unit 803 determines that the mixed color correction is not necessary and determines that the calibration contents to be executed is the "single color correction".

In step 1004, the analysis unit 803 determines that the mixed color correction is necessary and determines that the calibration contents to be executed is the "mixed color correction".

In step 1005, the analysis unit 803 sets the contents of the calibration to be executed, according to the determination in step 1003 or 1004 (write-in to the recording part).

In step 1006, the analysis unit 803 determines whether it is timing to execute the calibration or not. Specifically, the analysis unit 803 determines whether the preliminarily set execution condition is satisfied or not (here, whether the number of processed jobs reaches the predetermined number of jobs [D] or not). When the condition for the calibration execution is determined to be satisfied, the process proceeds to step 1007. On the other hand, when the condition for the calibration execution is determined not to be satisfied, the analysis unit 803 keeps the correction flag in "OFF" and skips this processing.

In step 1007, the analysis unit 803 sets the correction flag for the instruction of the calibration execution to "ON".

The contents of the color correction and whether the color correction is to be executed or not are determined in this manner, and the correction unit 801 executes the calibration according to this determination. That is, the correction unit 801 confirms the contents set in step 1005 when the correction flag has been set to ON in step 1007, and executes only the single color correction when the set contents indicate the "single color correction" and executes the single color correction and successively the mixed color correction when the set contents indicate the "mixed color correction".

As explained above, the present embodiment obtains the past color utilization ratio in the unit of a page utilizing the print log (job history) and automatically determines the most appropriate calibration contents and the execution timing. Thereby, it becomes possible to effectively reduce the consumption of human power, time, toner, and the like required for the calibration.

Embodiment 2

Figure 14:
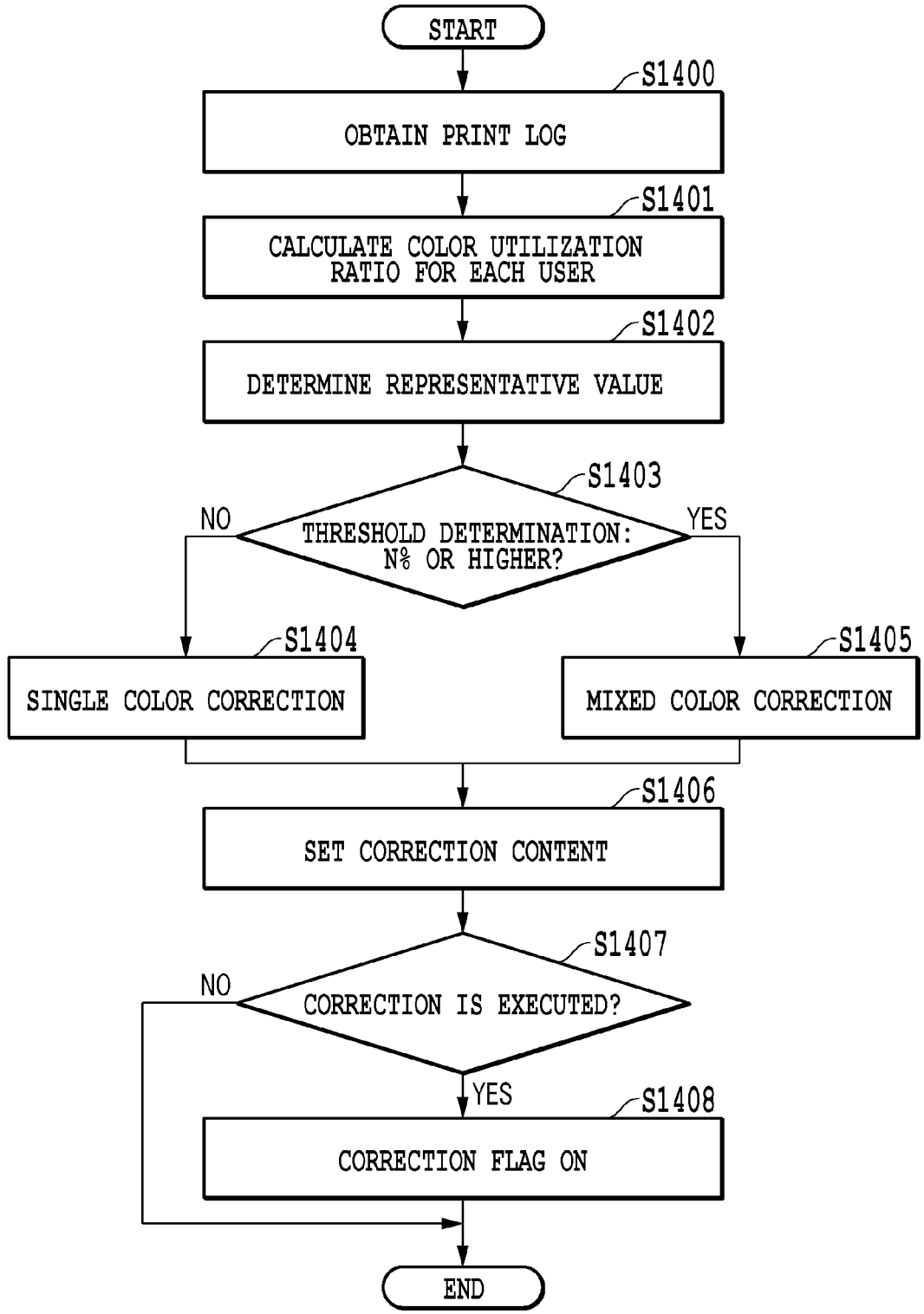
FIG. 14 is a flowchart showing a processing flow in an analysis unit according to embodiment 2.

Next, a mode of determining the calibration contents using the color utilization ratio obtained for each user will be explained as embodiment 2. Note that explanation will be simplified or omitted for a part common to already explained embodiment 1 and the explanation will be provided here with a central focus on a different point. FIG. 14 is a flowchart showing a processing flow in the analysis unit 803 according to the present embodiment.

When obtaining the print log in step 1400, the analysis unit 803 obtains the color utilization ratio for each user from the obtained print log, in succeeding step 1401. At this time, the analysis unit 803 obtains the above described color utilization ratio for each user by referring to the information "job owner name" included in the print log. FIG. 15 is a table showing an example of the color utilization ratio for each user obtained in this step. In FIG. 15, the color utilization ratio [P] is obtained for each of User_1 to User_x.

Then, in step 1402, the analysis unit 803 selects a representative value to be used for the comparison with a threshold value in determination processing of step 1403 from the obtained color utilization ratios for respective users. The representative value is determined by a predetermined criterion such as the color utilization ratio of a user recording the highest value, for example. In the example of FIG. 15, the color utilization ratio of "User_2" shows the highest value of 46% and "46%" which is the color utilization ratio of User_2 is selected as the representative value.

Then, the selected representative value (here, 46(%)) is compared with the predetermined threshold value (e.g., 40), and it is determined whether the mixed color correction is necessary or not and the calibration contents are set (step 1403 to step 1406).

Following step 1407 and step 1408 correspond to step 1006 and step 1007 in the flowchart of FIG. 10 according to embodiment 1, and explanation will be omitted.

As explained above, according to the present embodiment, the color utilization ratio is obtained for each user and thereby the calibration contents are determined. Note that, when the selection criterion of the representative value is assumed to be the color utilization ratio of a user recording the highest color utilization ratio as in the present embodiment, it is determined that the mixed color correction is necessary even when only one user records a color utilization ratio exceeding the threshold value. Thereby, it becomes possible to suppress wasting of time for the calibration and to reduce the consumption material effectively while realizing the user's desire to perform high quality color output.

Embodiment 3

In embodiment 1 and embodiment 2, the color utilization ratio is obtained from the print log information and the necessity of the mixed color correction is determined by whether the obtained color utilization ratio exceeds the preliminarily set threshold value or not. In the following, a mode of determining a frequency of the mixed color correction in association with a utilization situation of the image forming apparatus will be explained as embodiment 3. Note that explanation will be simplified or omitted for a part common to embodiments 1 and 2 and the explanation will be provided with a central focus on a different point.

Figure 16:
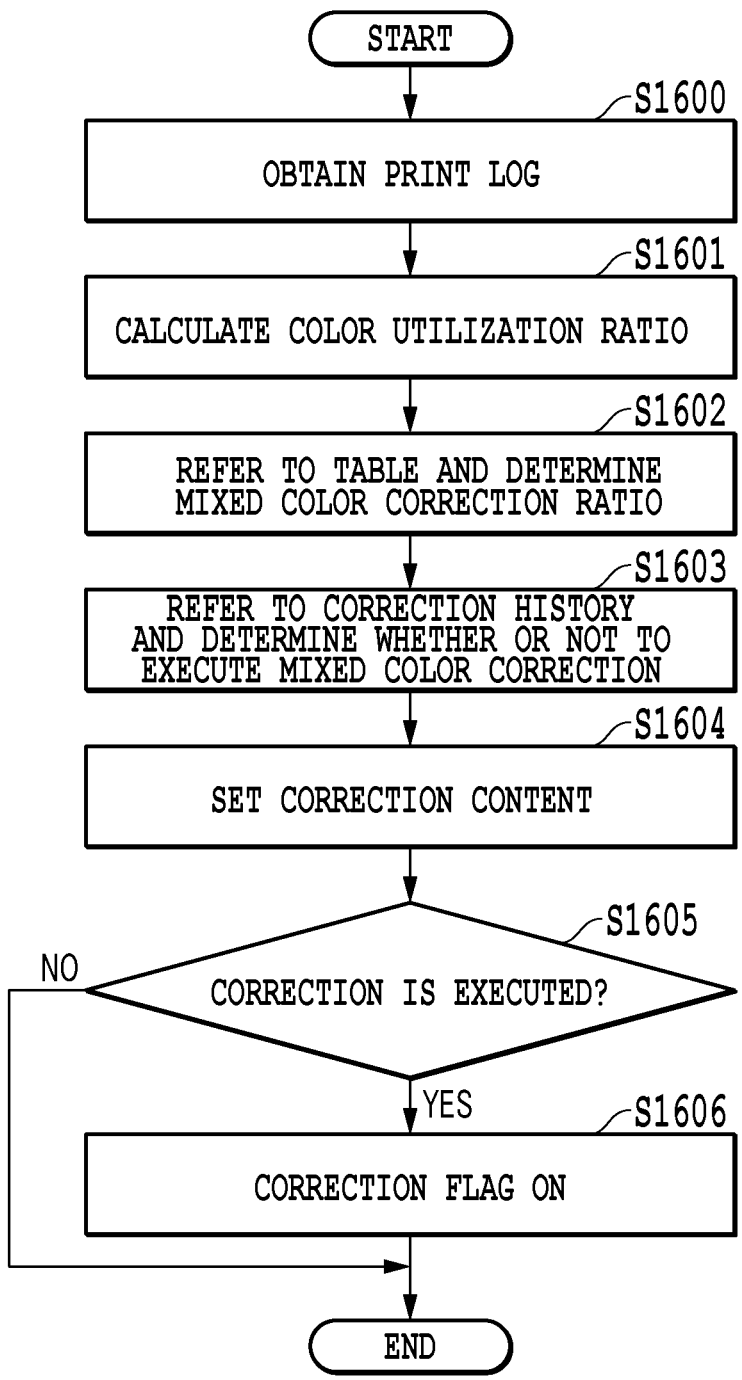
FIG. 16 is a flowchart showing a processing flow in an analysis unit according to embodiment 3.

FIG. 16 is a flowchart showing a processing flow in the analysis unit 803 according to the present embodiment.

When having obtained the print log in step 1600, the analysis unit 803 obtains the color utilization ratio [P] from the obtained print log in succeeding step 1601 by the same method as that of embodiment 1.

Note that the analysis unit 803 may obtain the color utilization ratio for each user as in embodiment 2. In this case, successively the analysis unit 803 calculates a ratio of users [PU] who record color utilization ratios exceeding the threshold value among the color utilization ratios obtained for respective users. Here, the ratio [PU] is calculated by the following formula.

*PU*=Number of users recording color utilization ratios exceeding the threshold value/Number of all the users When having obtained the color utilization ratio [P] (or the ratio [PU]), the process proceeds to step 1602.

Then, in step 1602, the analysis unit 803 obtains an execution frequency of the mixed color correction corresponding to the obtained color utilization ratio [P] (or ratio [PU]) by referring to a table defining the execution frequency of the mixed color correction. FIGS. 17A and 17B are an example of the table defining the execution frequency of the mixed color correction, and show the execution frequency of the mixed color correction corresponding to the color utilization ratio [P] and the execution frequency of the mixed color correction corresponding to the ratio [PU] of the users recording the color utilization ratios exceeding the threshold value, respectively. Note that this table is generated preliminarily and retained in the recording part of the RAM 53.

In step 1603, the analysis unit 803 obtains the calibration execution history information from the recording part and determines whether the mixed color correction is necessary or not, by referring to the mixed color correction execution frequency obtained in step 1602. For example, when the single color correction has been executed in nine times so far and the obtained mixed color correction execution frequency is "once in ten times", the mixed color correction is determined to be necessary.

Then, in step 1604, the analysis unit 803 sets the calibration contents (mixed color correction or single color correction) into the recording part according to the determination contents in step 1603.

Following step 1605 and step 1606 correspond to step 1006 and step 1007 in the flowchart of FIG. 10 according to embodiment 1, and explanation will be omitted.

As explained above, according to the present embodiment, the past color utilization ratio is associated with the mixed color correction frequency, and thereby it is possible to suppress excessive execution of the mixed color correction effectively.

Embodiment 4

Next, a mode of analyzing information of the color material used in the color printing and reflecting the analysis result to the determination of the calibration contents will be explained as embodiment 4. Note that a multi-function printer provided with functions of copier, FAX, and the like is assumed as the image forming apparatus 10 in the present embodiment.

Recently, color printing using only a specific color (in the following, called "mono-color printing") has been proposed discriminated from full-color printing. The mono-color printing includes two-color printing of performing printing by leaving an achromatic part as it is and by replacing a chromatic part by a gray scale expression using one specific chromatic color designated by a user, other than single color printing performing printing using any one color designated by the user. Before explanation of processing according to the present embodiment, print setting for mono-color printing as described above will be explained.

Figure 18A:
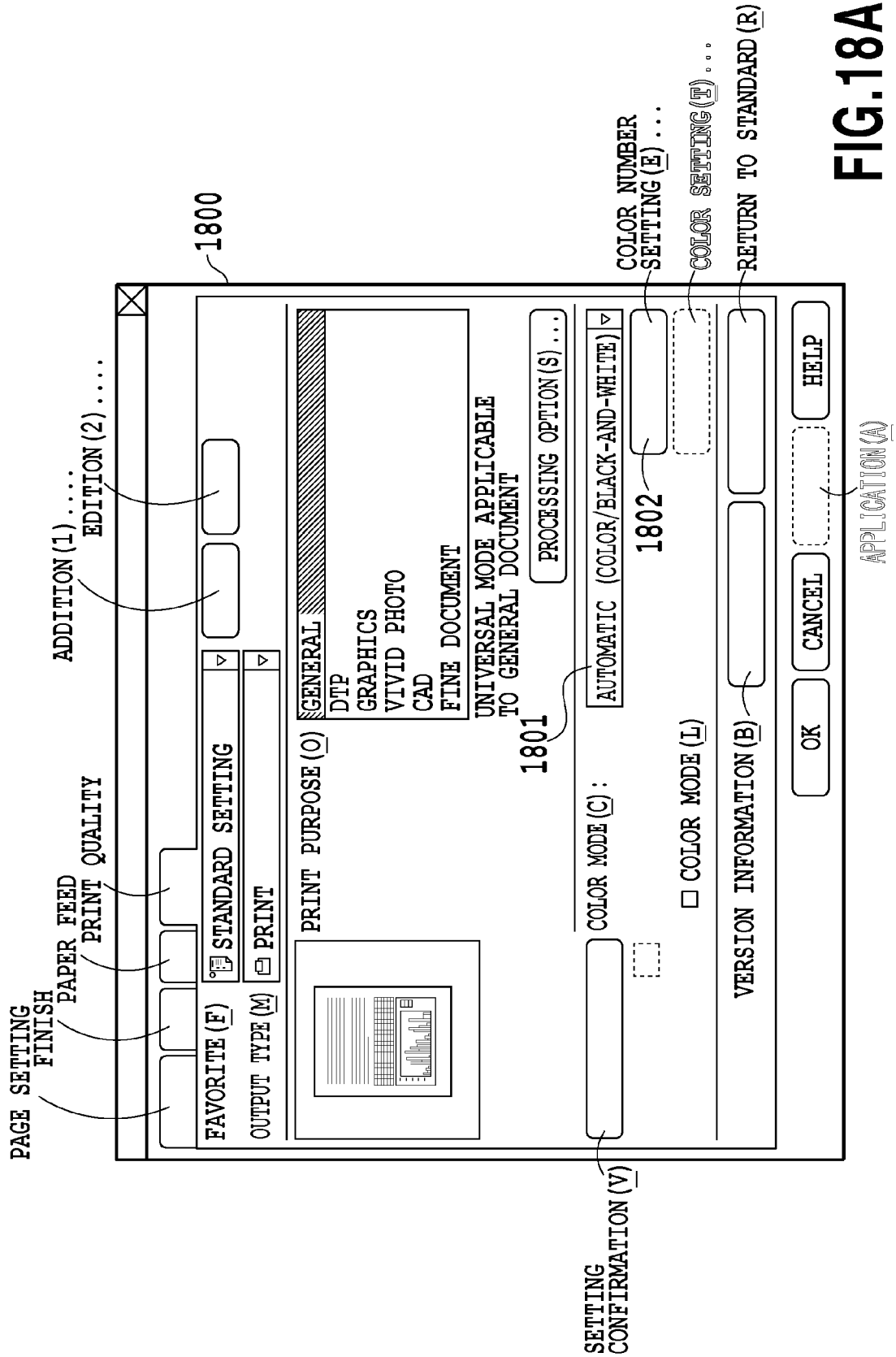
FIG. 18A and FIG. 18B are diagrams showing an example of a user interface for performing print setting by a computer or the like, and show a main dialog and a sub-dialog, respectively.
Figure 18B:
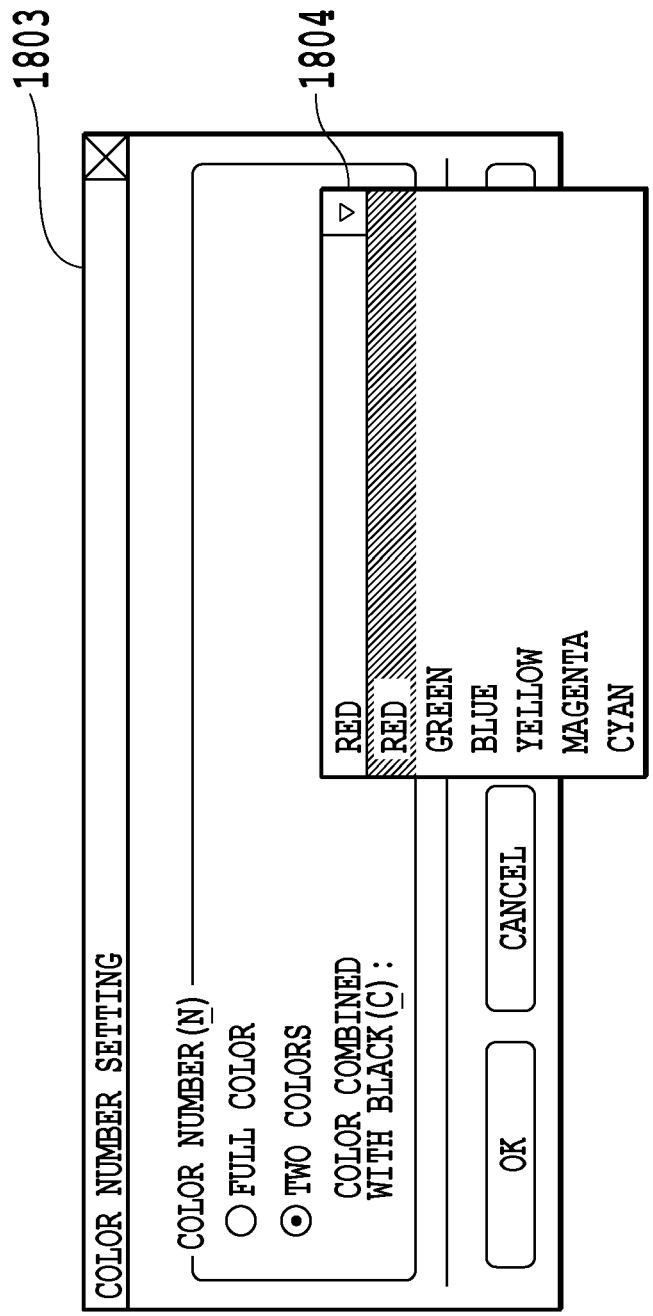

FIGS. 18A and 18B show an example of a user interface for performing print setting which is displayed by a printer driver on a computer (not shown in the drawing) when print data is transmitted from the computer and printed in the image forming apparatus 10, for example. A user designates a color mode (color, black-and-white, or automatic) roughly at a color mode selection region 1801 in a main dialog 1800 shown in FIG. 18A. Further, by the press-down of a color number setting button 1802, a sub-dialog 1803 shown in FIG. 18B is displayed and the user designates the number of colors in the color printing. Here, either of the full color printing and the two-color printing can be selected (obviously, the single color printing may be added to the options). When the two-color printing is selected, the user further selects one chromatic color (here, red, green, blue, yellow, magenta, or cyan) to be coupled to black from a pull-down menu in a color selection region 1804. The print setting information designated in this manner is included in print data (PDL data), and the image forming apparatus 10 having received the print data can understand the contents of the print setting for a print job by analyzing this print data.

Figure 19A:
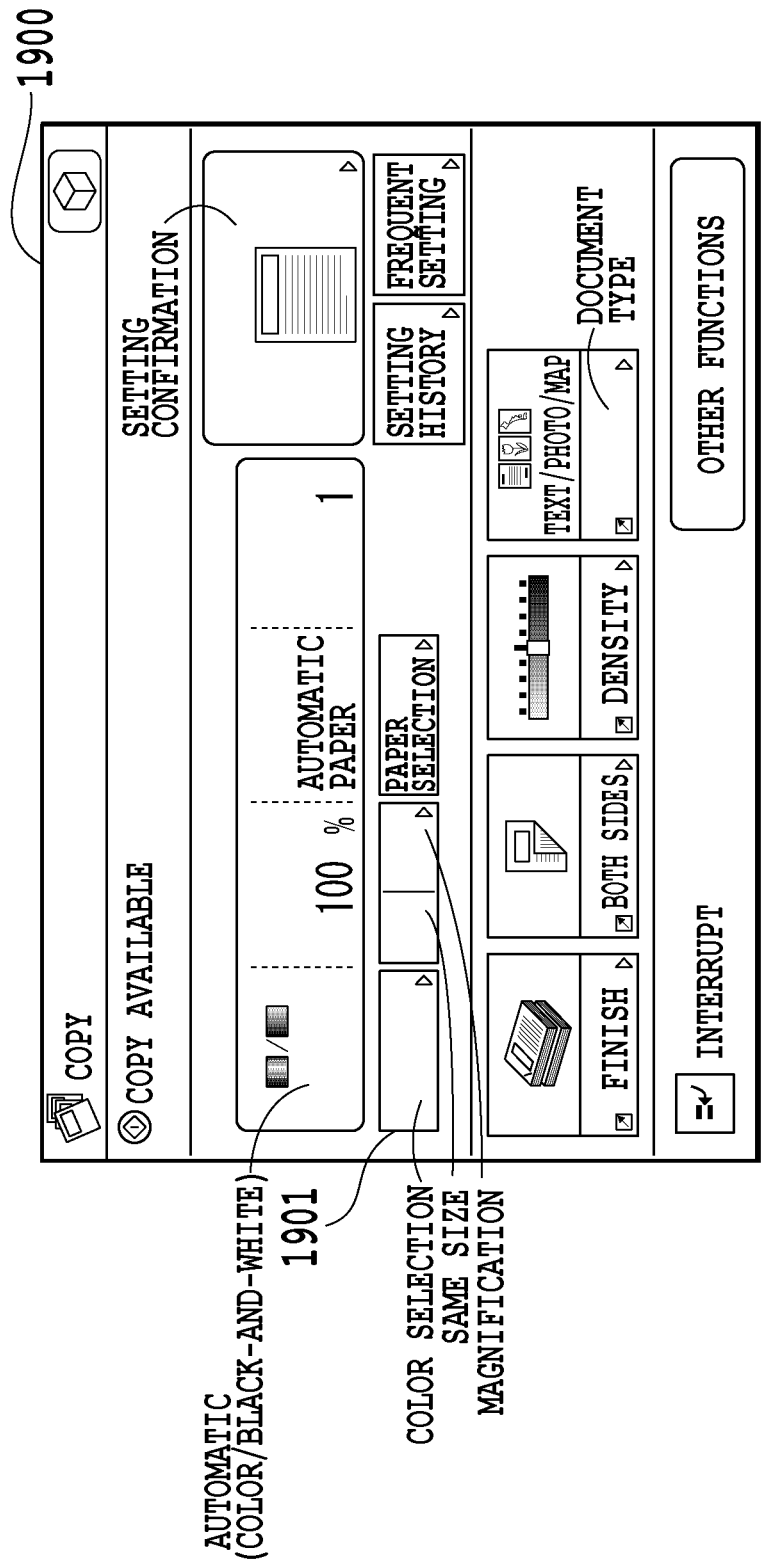
FIGS. 19A to 19C are diagrams showing an example of a user interface for performing copy setting in an image forming apparatus.
Figure 19B:
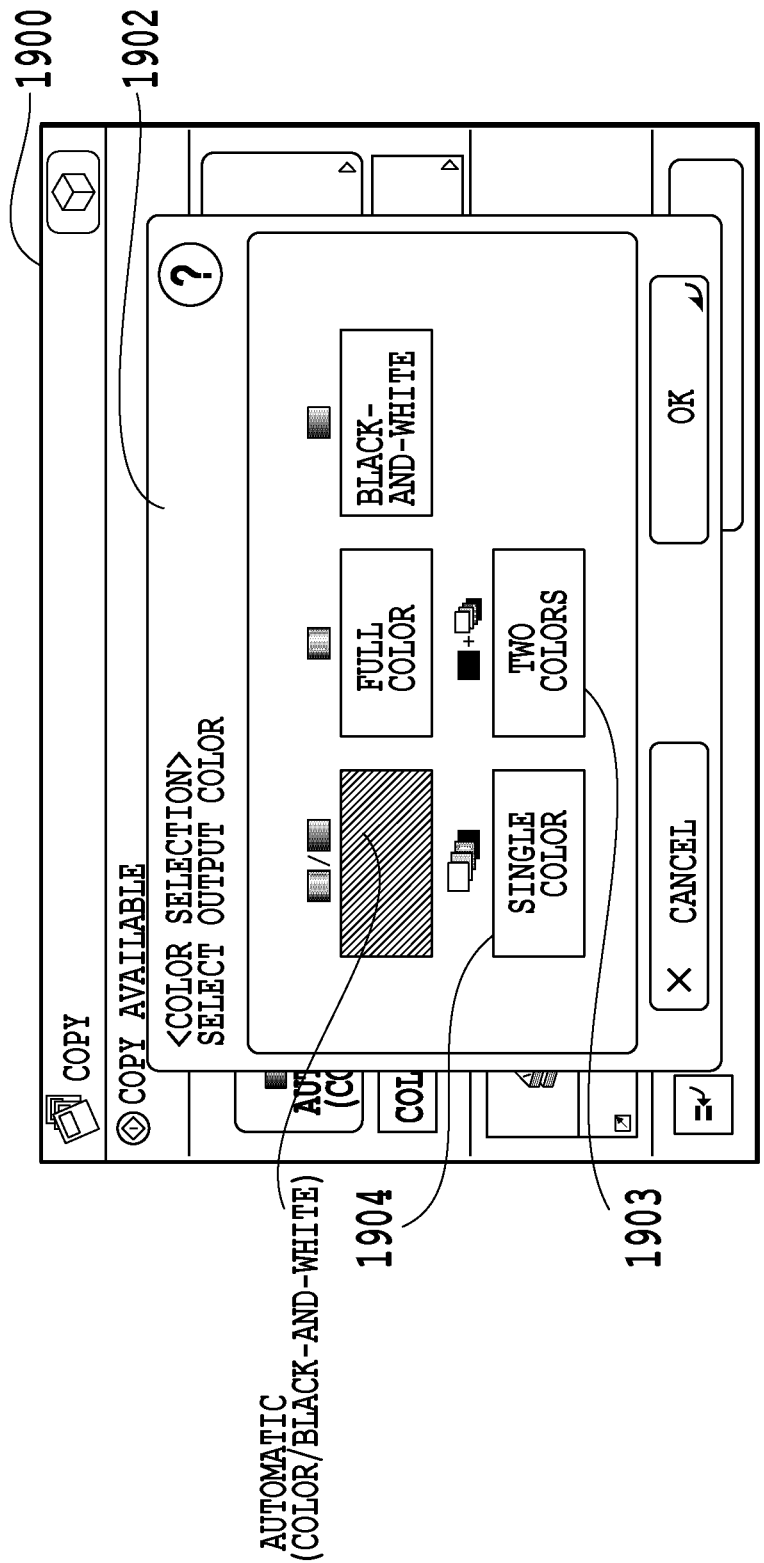
Figure 19C:
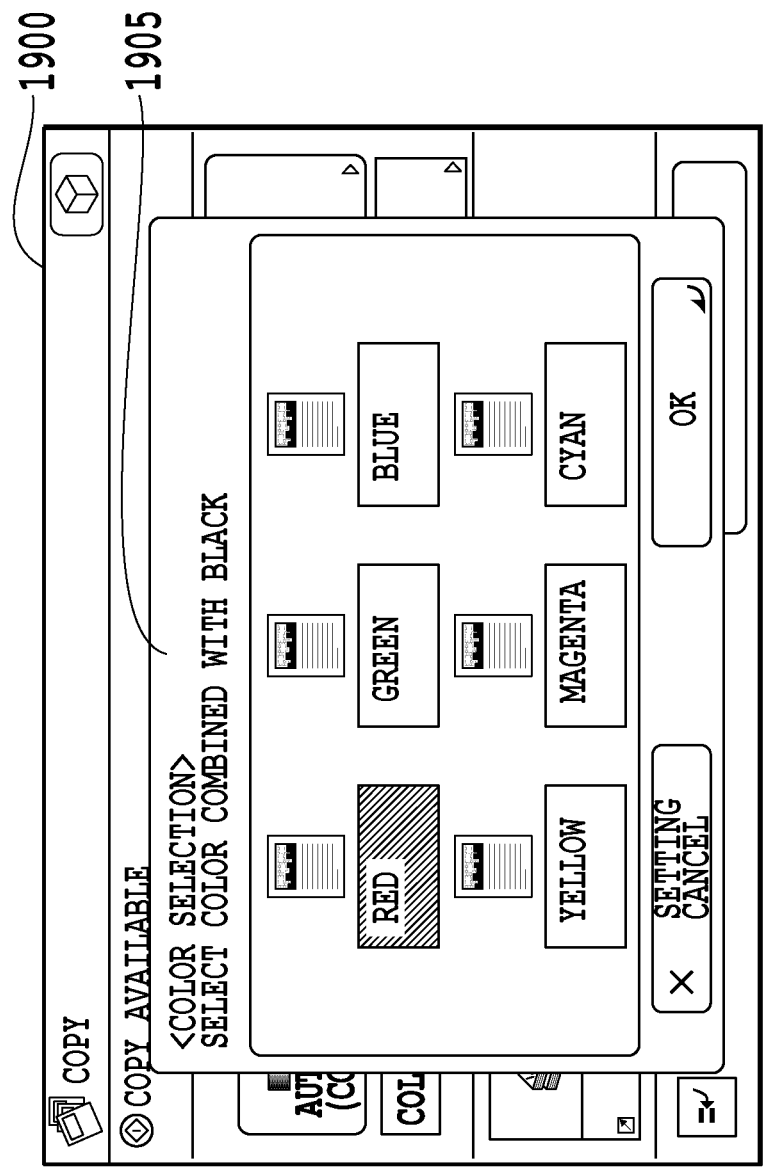

FIGS. 19A to 19C show an example of a user interface for designating details of copy setting which is displayed on the display unit 61 of the image forming apparatus 10, when copying of a paper document is performed, for example. When a color mode selection button 1901 is pressed down in a main dialog 1900 shown in FIG. 19A, a sub-dialog 1902 shown in FIG. 19B is displayed. In this sub-dialog 1902, a two-color button 1903 and a single color button 1904 are disposed and can be selected optionally, and when the two-color button 1903 is pressed down, for example, a sub-dialog 1905 shown in FIG. 19C is further displayed. In this sub-dialog 1905, red, green, blue, yellow, magenta, or cyan can be selected as a color to be used together with black. Also when the single color button 1904 is selected, a similar dialog is displayed and any one color can be selected.

Note that, when the single color printing or the two-color printing can be set as the contents of the color printing as described above, a history for the "mono-color" is left in the print log (job history) as described later.

Figure 20:
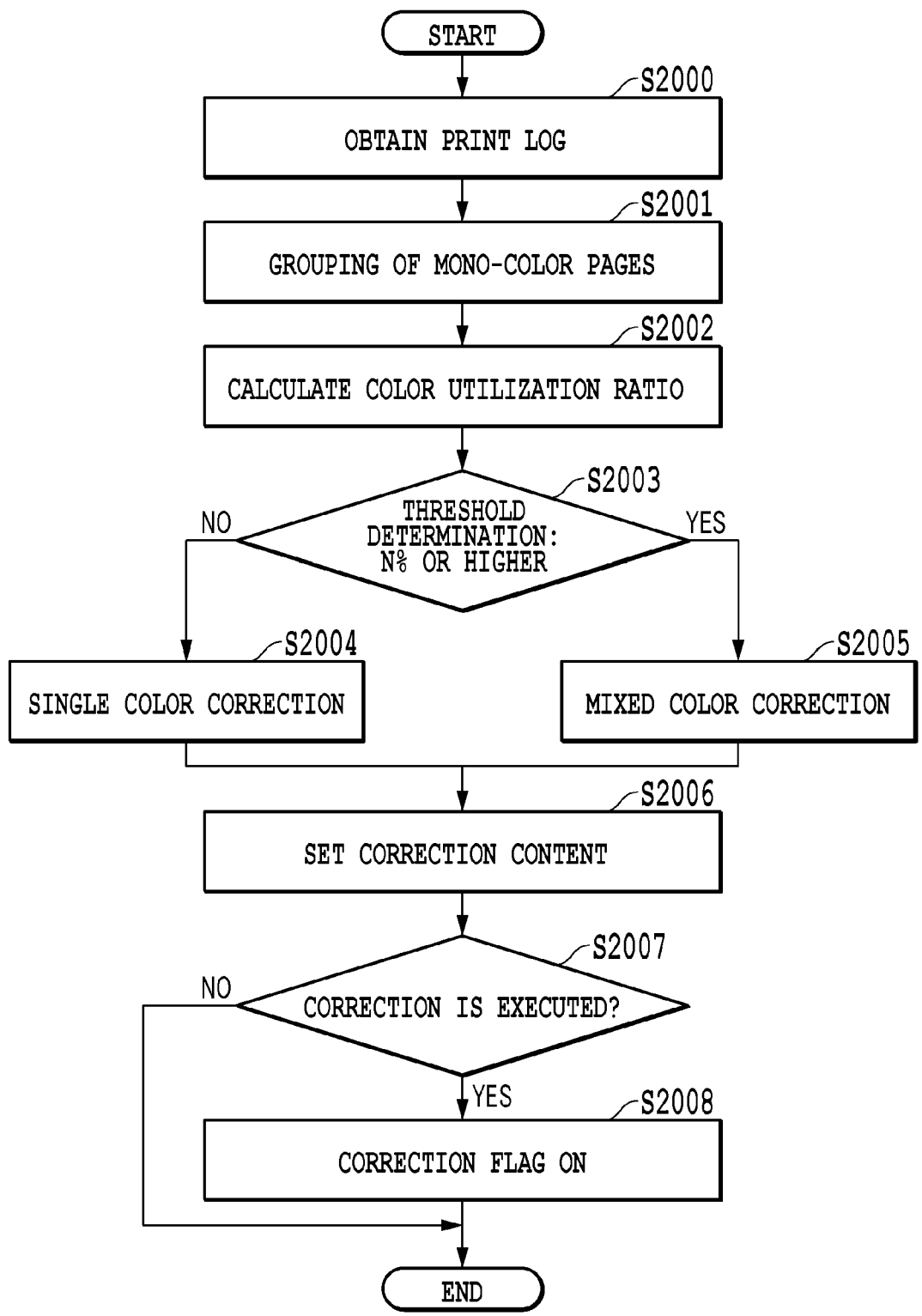
FIG. 20 is a flowchart showing a processing flow in an analysis unit according to embodiment 4.

Next, processing in the analysis unit 803 according to the present embodiment will be explained. FIG. 20 is a flowchart showing a processing flow in the analysis unit 803 according to the present embodiment. Note that explanation will be simplified or omitted for a part common to already described embodiments 1 to 3, and the explanation will be provided with a central focus on a different point.

First, the analysis unit 803 obtains the print log in step 2000. FIG. 21 shows an example of the print log obtained in this step. In addition to the information included in the print log shown in FIG. 11B according to embodiment 1, the print log further includes information of the total number of mono-color pages, the number of impositions for a paper size therein, and color (color of the mono-color) used in the mono-color printing.

In succeeding step 2001, the analysis unit 803 divides all the mono-color pages in an analysis target range into two groups, using the information regarding the mono-color included in the print log.

Group 1: mono-color page group using cyan, magenta, or yellow

Group 2: mono-color page group using red, green, or blue

The reason to perform such group division is that, while each of cyan, magenta, and yellow is expressed by a single color, the color belonging to group 2 is expressed by a mixed color, as red: cyan+magenta, green: cyan+yellow, and blue: yellow+magenta. The information regarding the mono-color pages divided into the groups is retained in the RAM 53 as the total number of the mono-color pages [PM], the total number of the mono-color pages belonging to group 1 [M1], and the total number of the mono-color pages belonging to group 2 [M2].

In step 2002, the analysis unit 803 obtains the color utilization ratio [P] using the information of the mono-color pages divided into the groups. The color utilization ratio [P] in this step is obtained using the following formula.

Color utilization ratio [P]=(Number of color pages [PC]/Total number of pages [PT])×100(%)

Here,

Number of color pages [PC]=Total number of pages [PT]−(Number of black-and-white pages [PB]+ [PM1])

That is, only the number of the mono-color pages in group 2 [M2] is counted as the number of the color pages [PC] and the total number of the mono-color pages in group 1 [M1] is not counted as the number of the color pages [PC]. This is because, from the viewpoint of the color correction, while the single color correction is satisfactory for a mono-color print using cyan, magenta, or yellow, the mixed color correction is necessary for outputting a high quality mono-color print using red, green, or blue.

For example, when the total number of jobs to be analyzed is 10 jobs, the total number of pages for the 10 jobs [PT] is 100 pages, the number of black-and-white pages [PB] thereof is 70 pages, and the number of pages of group 1 [M1] is 10 pages, the obtained color utilization ratio [P] is provided as follows.

Color utilization ratio [P]=((100−(70+10))/100× 100=20(%)

By the use of the color utilization ratio obtained in this manner, succeeding step 2003 to step 2008 are executed. Note that step 2003 to step 2008 correspond to step 1002 to step 1007 in the flowchart of FIG. 10 according to embodiment 1, and explanation will be omitted.

Note that the mode of reflecting the analysis result of the color material used in the color printing to the determination of the calibration contents according to the present embodiment may be combined with the modes described in embodiment 2 and embodiment 3.

As described above, according to the present embodiment, it is possible to determine more appropriate calibration contents coupled with the characteristic and use situation of the color material used in the color printing.

Embodiment 5

In embodiments 1 to 4, the color utilization ratio is obtained in the unit of a page. In the following, a mode of generating and retaining an image log corresponding to the print job and obtaining the color utilization ratio using a ratio (area ratio) of a color part in this image log will be explained as embodiment 5.

First, image log generation and retaining used in the present embodiment will be explained. The image log is information regarding a history of an image itself according to a print job, and the output unit 802 performs this generation and retaining together with the generation and retaining of the print log which was described above. Here, while the format of the image log is assumed to be a full color bit map for each page, another typical format such as JPEG and TIFF may be used if the format can discriminate color objects. When the print log and the image log have been written in the log part, the analysis unit 803 is informed of the log write-in event.

Figure 22:
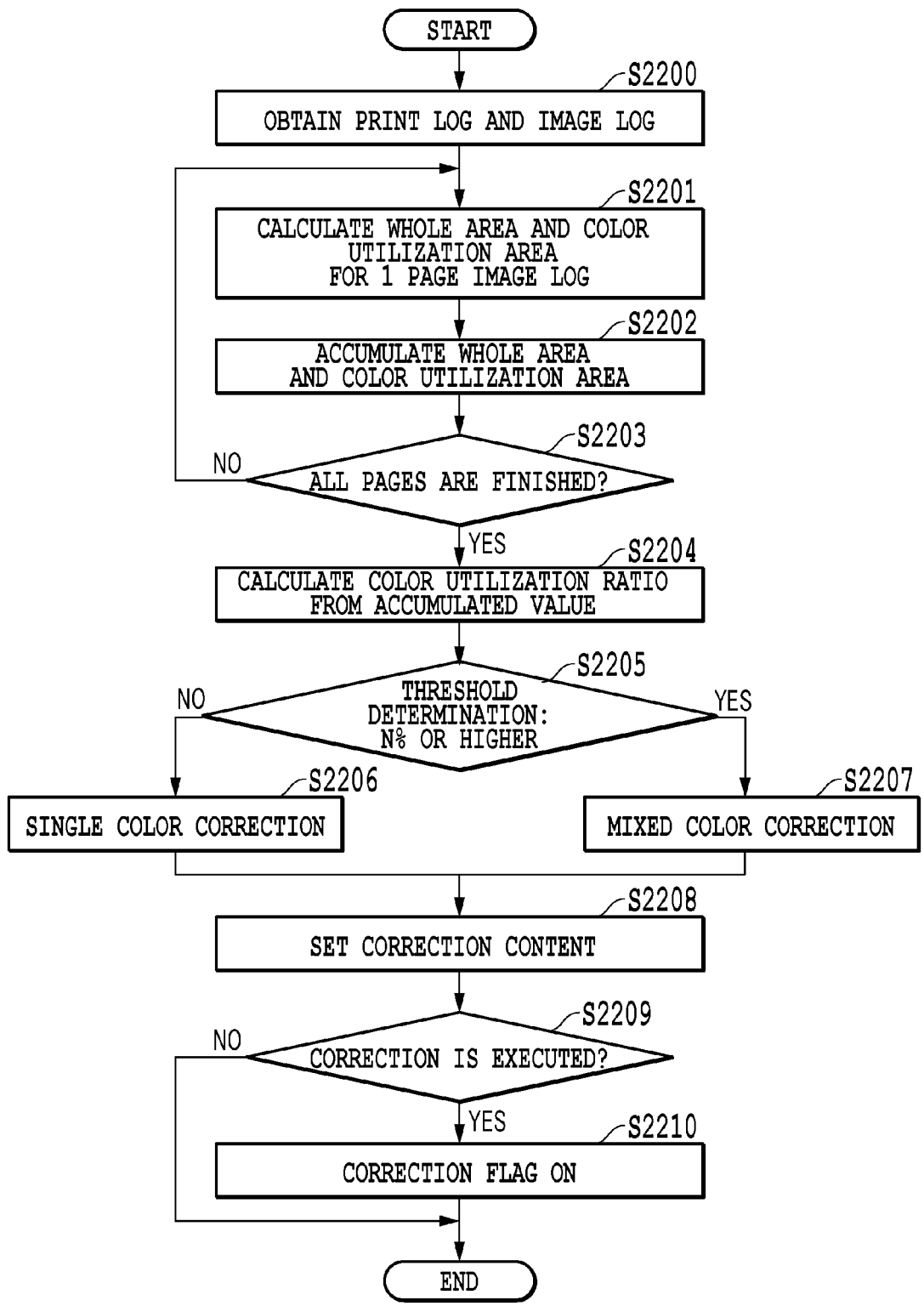
FIG. 22 is a flowchart showing a processing flow in an analysis unit according to embodiment 5.

FIG. 22 is a flowchart showing a processing flow in the analysis unit 803 according to the present embodiment. Note that explanation will be simplified or omitted for a part common to already described embodiments 1 to 4 and the explanation will be provided with a central focus on a different point.

In step 2200, the analysis unit 803 obtains the print log and the image log.

In succeeding step 2201, the analysis unit 803 uses an image log for one page in the image log corresponding to a job to be analyzed and obtains each of a total area of the image log and an area of a color utilization part. Specifically, the analysis unit 803 obtains the area by determining whether color is utilized or not for each dot of the full color bit map of the image log for one page. In this case, the total number of the dots corresponds to the total area and the number of the dots utilizing color corresponds to the color utilization area.

In step 2202, the analysis unit 803 accumulates each of the obtained information sets of the total area (total number of the dots) and the area of the color utilization part (number of color dots) and retains the result in the recording part.

In step 2203, the analysis unit 803 determines whether the above described processing has been completed or not for all the pages of the image logs corresponding to all the jobs to be analyzed. When the processing has completed for all the pages, the process proceeds to step 2204. On the other hand, when an unprocessed page exists, the process returns to step 2201 and repeats the processing in step 2201 and step 2202.

In step 2204, the analysis unit 803 obtains the color utilization ratio [P] by fitting a total sum (accumulated value) of the whole area (total number of dots) and an area of the color utilization part (number of color dots) into the following formula.

Color utilization ratio [P]=(Area of color utilization part/Total area)×100(%)

Then, succeeding step 2205 to step 2209 are executed by the use of the obtained color utilization ratio. Note that step 2205 to step 2209 correspond to step 1002 to step 1007 in the flowchart of FIG. 10 according to embodiment 1, and explanation will be omitted.

As described above, the present embodiment obtains the color utilization ratio as an area ratio from the image log corresponding to the job to be analyzed. Accordingly, the mixed color correction is determined not to be necessary in a case in which, while full color objects exist across all the pages of a job to be analyzed, almost all the full color objects are only small size objects and the single color correction is used satisfactory. In this manner, it is possible to determine the contents of the calibration more appropriately by considering an area (amount) in which color is actually utilized.

Embodiment 6

Recently, a network type document management system is proposed in which document data subjected to processing of copy, print, scan, or FAX in a multi-function printer is stored in a document management server together with log information and can be searched for and browsed afterword by a document management client for the purpose of preventing information leakage.

Figure 23:
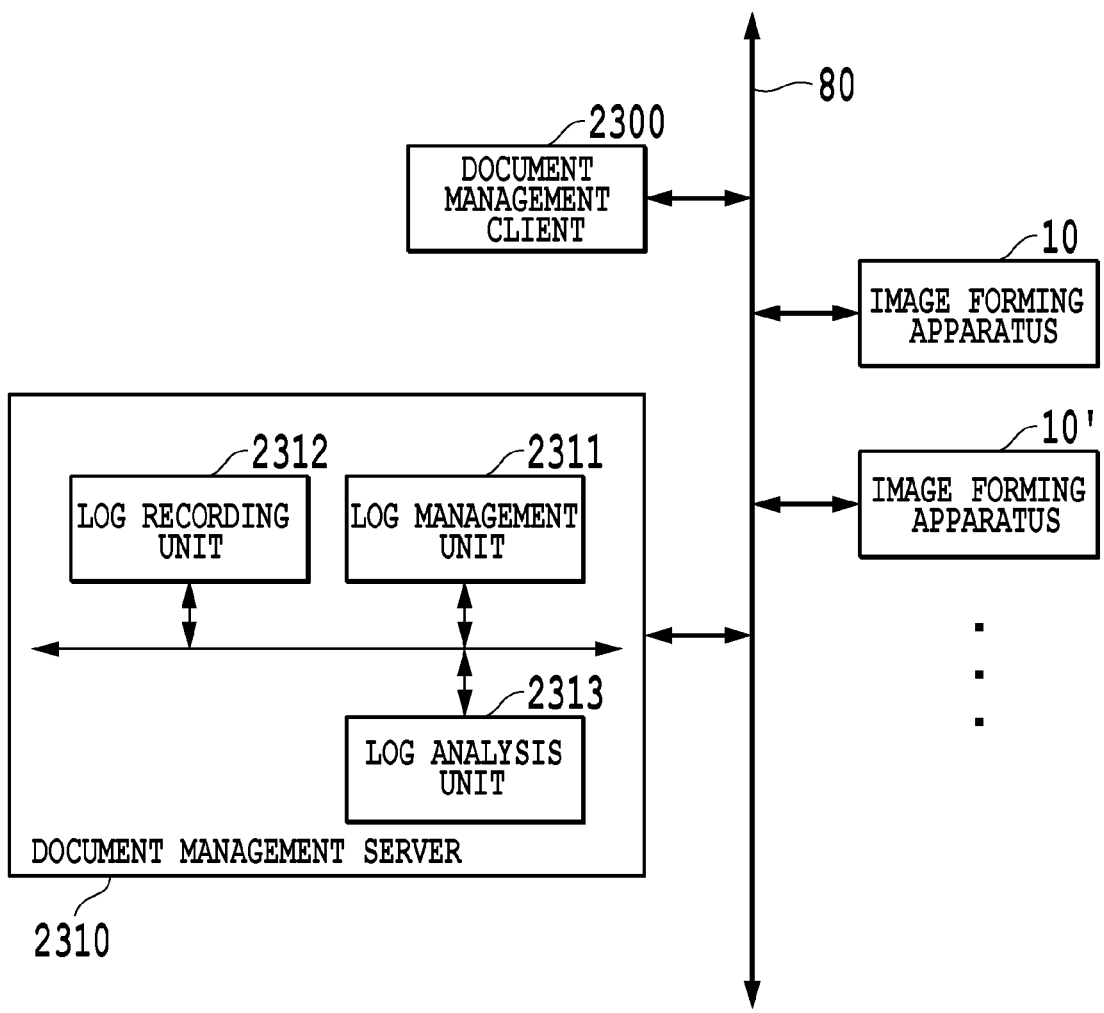
FIG. 23 is a diagram showing a configuration example of a network type document management system.

FIG. 23 is a diagram showing a configuration example of a network type document management system, and the image forming apparatuses 10 and 10', a document management client 2300, and a document management server 2310 are connected to one another by the network 80. Further, the document management server 2310 includes a log management unit 2311, a log recording part 2312, and an image log analysis unit 2313. The log management unit 2311 obtains a log and manages a log write-in event. The log recording part 2312 records the obtained log information. The log analysis unit 2313 corresponds to the analysis unit 803 in each of the image forming apparatuses 10 and 10', and executes the processing in above embodiments instead of the analysis unit 803.

By utilizing such a network type document management system, it is possible to control the calibration explained in embodiments 1 to 5 in plural image forming apparatuses on a network while considering utilization situations thereof.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer, for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-185853, filed Aug. 29, 2011 which are hereby incorporated by reference herein in their entirety.

What is claimed is:

1. An image forming apparatus, comprising:
a log obtaining unit configured to obtain a print log which is an execution history of a print job;
a color utilization ratio obtaining unit configured to obtain the total number of color pages and the total number of black-and-white pages in the total number of pages in past print jobs from the print log obtained by the log obtaining unit and to obtain a color utilization ratio indicating the ratio of the total number of color pages in the past print jobs from the obtained result;
a determination unit configured to determine to perform mixed color correction and single color correction when the color utilization ratio obtained by the color utilization ratio obtaining unit is equal to or larger than a threshold value and to perform the single color correction without performing the mixed color correction when the color utilization ratio is smaller than the threshold value; and
a correction unit configured to perform the correction determined by the determination unit.

2. The image forming apparatus according to claim 1, wherein
the correction unit executes the correction determined by the determination unit after it has been determined that a preliminarily set number of jobs were executed.

3. The image forming apparatus according to claim 1, wherein the color utilization ratio obtaining unit obtains the color utilization ratio for each user and selects a representative value from among the obtained color utilization ratios, and
the determination unit determines whether or not to perform the mixed color correction, by comparing the selected representative value with the threshold value.

4. The image forming apparatus according to claim 1, further comprising:
a unit configured to obtain a correction execution history; and
a unit configured to obtain a mixed-color correction execution frequency corresponding to the obtained color utilization ratio using a table defining the mixed-color correction execution frequency, wherein
the determination unit compares the obtained correction execution history with the obtained mixed-color correction execution frequency to determine whether or not to perform the mixed color correction.

5. The image forming apparatus according to claim 1, wherein
the print log includes information of mono-color print, wherein
the image forming apparatus further comprises a grouping unit configured to divide the mono-color print pages in a past job into a group using a single color and a group using a mixed color, by using the mono-color print information, and wherein
the color utilization ratio obtaining unit treats the mono-color print pages in the group using the mixed color as the color pages among the mono-color print pages to obtain the color utilization ratio.

6. An image forming method, comprising:
a log obtaining step of obtaining a print log which is an execution history of a print job;
a color utilization ratio obtaining step obtain the total number of color pages and the total number of black-and-white pages in the total number of pages in past print jobs from the obtained print log and to obtain a color utilization ratio indicating the ratio of the total number of color pages in the past print jobs from the obtained result;
a determination step of determining to perform mixed color correction and single color correction when the color utilization ratio obtained in the color utilization ratio obtaining step is equal to or larger than a threshold value and to perform the single color correction without performing the mixed color correction when the color utilization ratio is smaller than the threshold value; and
a correction step of performing the correction determined by the determination step.

7. A document management system in which at least an image forming apparatus and a document management server are connected via a network, the document management server comprising:
a log obtaining unit configured to obtain a print log which is an execution history of a print job executed in the image forming apparatus;
a color utilization ratio obtaining unit configured to obtain the total number of color pages and the total number of black-and-white pages in the total number of pages in past print jobs from the print log obtained by the log obtaining unit and to obtain a color utilization ratio indicating the ratio of the total number of color pages in the past print jobs from the obtained result;
a determination unit configured to determine to perform mixed color correction and single color correction when the color utilization ratio obtained by the color utilization ratio obtaining unit is equal to or larger than a threshold value and to perform the single color correction without performing the mixed color correction when the color utilization ratio is smaller than the threshold value; and a setting unit configured to set contents of the correction determined by the determination unit.

* * * * *